United States Patent
Lee et al.

(10) Patent No.: US 12,456,233 B2
(45) Date of Patent: Oct. 28, 2025

(54) WEARABLE ELECTRONIC DEVICE FOR DISPLAYING OBSTACLE-RELATED INFORMATION, OPERATING METHOD, AND STORAGE MEDIUM

(71) Applicant: Samsung Electronics Co., Ltd., Suwon-si (KR)

(72) Inventors: Sanghun Lee, Suwon-si (KR); Sungoh Kim, Suwon-si (KR); Jihyun Kim, Suwon-si (KR); Valeriy Prushinskiy, Suwon-si (KR); Donghyun Yeom, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/978,844

(22) Filed: Dec. 12, 2024

(65) Prior Publication Data

US 2025/0131612 A1    Apr. 24, 2025

Related U.S. Application Data

(63) Continuation of application No. PCT/KR2023/010566, filed on Jul. 21, 2023.

(30) Foreign Application Priority Data

Aug. 2, 2022   (KR) .................. 10-2022-0096217
Aug. 29, 2022  (KR) .................. 10-2022-0108551

(51) Int. Cl.
*G06T 11/00*     (2006.01)
*G06F 3/01*      (2006.01)
(Continued)

(52) U.S. Cl.
CPC .............. *G06T 11/00* (2013.01); *G06F 3/013* (2013.01); *G06V 10/764* (2022.01); *G06V 20/20* (2022.01); *G06V 20/50* (2022.01); *G06T 2200/24* (2013.01)

(58) Field of Classification Search
CPC ..... G06T 11/00; G06T 2200/24; G06F 3/013; G06F 1/163; G06F 1/1686; G06F 3/011;
(Continued)

(56) References Cited

U.S. PATENT DOCUMENTS 9,081,177 B2    7/2015  Wong et al.
9,341,849 B2    5/2016  Wong et al.
(Continued)

FOREIGN PATENT DOCUMENTS

JP    2007-030753 A    2/2007
JP    2018-180192 A    11/2018
(Continued)

OTHER PUBLICATIONS

International Search Report dated Oct. 27, 2023, issued in International Patent Application No. PCT/KR2023/010566.
(Continued)

*Primary Examiner* — Abhishek Sarma
(74) *Attorney, Agent, or Firm* — Jefferson IP Law, LLP

(57) ABSTRACT

A wearable electronic device is provided. The wearable electronic device includes a camera, a display, a microphone, a sensor, memory storing one or more computer programs, and one or more processors communicatively coupled with the camera, the display, the microphone, the sensor, and the memory, wherein the one or more computer programs include computer-executable instructions that, when executed by the one or more processors individually or collectively, cause the wearable electronic device to determine an environment level indicating a degree of danger of (Continued)

a surrounding environment for a user of the wearable electronic device based on an image obtained through the camera, determine whether to use the sensor, the camera, and the microphone depending on the determined environment level, obtain obstacle information and an estimated impulse between an obstacle and the user based on data input through at least one determined to be used among the sensor, the camera, or the microphone, determine a user interface (UI) level for displaying danger of collision between the obstacle and the user based on the environment level, the obstacle information, and the estimated impulse, generate a graphic entity indicating a direction and a danger degree of the obstacle depending on the UI level, and display an obstacle-related UI including the graphic entity on the display.

20 Claims, 18 Drawing Sheets

(51) Int. Cl.
*G06V 10/764* (2022.01)
*G06V 20/20* (2022.01)
*G06V 20/50* (2022.01)

(58) Field of Classification Search
CPC ...... G06V 10/764; G06V 20/20; G06V 20/50; G06V 20/52; G06V 40/18; G06V 20/58; G02B 27/0093; G02B 27/0172; G02B 2027/0138; G02B 2027/014; G02B 2027/0141; G02B 2027/0178; G01C 21/365
See application file for complete search history.

(56) References Cited

U.S. PATENT DOCUMENTS

| | | |
|---|---|---|
| 9,754,167 B1 | 9/2017 | Holz et al. |
| 11,099,638 B2 | 8/2021 | Johnson et al. |
| 11,110,343 B2 | 9/2021 | Hickman et al. |
| 11,127,182 B2 | 9/2021 | Mirhosseini et al. |
| 11,474,610 B2 | 10/2022 | Lee |
| 11,809,617 B2 | 11/2023 | Johnson et al. |
| 11,886,636 B2 | 1/2024 | Fujimaki |
| 2013/0335301 A1 | 12/2013 | Wong et al. |
| 2015/0277119 A1 | 10/2015 | Wong et al. |
| 2016/0232717 A1 | 8/2016 | Wong et al. |
| 2016/0301866 A1 | 10/2016 | Kim et al. |
| 2016/0332059 A1 | 11/2016 | Seeff |
| 2017/0286783 A1 | 10/2017 | Yim et al. |
| 2018/0012074 A1 | 1/2018 | Holz et al. |
| 2018/0272963 A1 | 9/2018 | Meyhofer et al. |
| 2019/0073829 A1 | 3/2019 | Holz et al. |
| 2019/0076731 A1 | 3/2019 | Hickman et al. |
| 2019/0378280 A1 | 12/2019 | Cho et al. |
| 2019/0384976 A1* | 12/2019 | Lee ........................ H04W 4/70 |
| 2020/0258278 A1 | 8/2020 | Mirhosseini et al. |
| 2021/0339678 A1 | 11/2021 | Kudo et al. |
| 2021/0382547 A1 | 12/2021 | Johnson et al. |
| 2021/0405638 A1 | 12/2021 | Boyraz et al. |
| 2022/0108508 A1 | 4/2022 | Mirhosseini et al. |

FOREIGN PATENT DOCUMENTS

| | | |
|---|---|---|
| JP | 2020-123013 A | 8/2020 |
| KR | 10-2016-0026532 A | 3/2016 |
| KR | 10-2017-0065738 A | 6/2017 |
| KR | 10-1807397 B1 | 12/2017 |
| KR | 10-2018-0114756 A | 10/2018 |
| KR | 10-2019-0098104 A | 8/2019 |
| KR | 10-2019-0100111 A | 8/2019 |
| KR | 10-2020-0044102 A | 4/2020 |
| KR | 10-2360453 B1 | 2/2022 |
| KR | 10-2022-0070665 A | 5/2022 |
| WO | 2018/175808 A1 | 9/2018 |
| WO | 2020/152737 A1 | 7/2020 |

OTHER PUBLICATIONS

European Search Report dated Jul. 17, 2025, issued in European Application No. 23850311.4.

* cited by examiner

| ENVIRONMENT LEVEL | DIVISION OF INSIDE AND OUTSIDE | DIVISION BY ANALYSIS OF VEHICLE-RELATED ELEMENT | DIVISION BY OBSTACLE COMPLEXITY |
|---|---|---|---|
| 0 | INSIDE | - | - |
| 1 | OUTSIDE | SIDEWALK NOT ADJACENT TO DRIVEWAY | FEW OBSTACLES |
| 2 | OUTSIDE | SIDEWALK NOT ADJACENT TO DRIVEWAY | MANY OBSTACLES |
| 3 | OUTSIDE | SIDEWALK ADJACENT TO DRIVEWAY | UNRELATED |
| 4 | OUTSIDE | SIDEWALK, CROSSING, CROSSWALK, OR THE LIKE | UNRELATED |

FIG. 7

| ENVIRONMENT LEVEL | IMU | Vision | Depth | Microphone |
|---|---|---|---|---|
| 0 | X | X | X | X |
| 1 | O | O | X | X |
| 2 | O | O | X | X |
| 3 | O | O | O | X |
| 4 | O | O | O | X |
| 5 | O | O | O | O |

FIG.8

| UI LEVEL | SET WHETHER TO DISPLAY | RELATIONSHIP WITH ANOTHER UI |
|---|---|---|
| Low | − | NOT DISPLAYED |
| Information | POSSIBLE | IT IS ABLE TO BE COVERED BY OTHER UI |
| Caution | IMPOSSIBLE | IT IS ABLE TO BE COVERED BY OTHER UI |
| Warning | IMPOSSIBLE | DISPLAYED ON OTHER UI |
| Danger | IMPOSSIBLE | HIDE OTHER UI EXCEPT FOR UI FOR WARNING |

FIG.10

| ENVIRONMENT LEVEL | MINIMUM UI LEVEL | MAXIMUM UI LEVEL |
|---|---|---|
| 0 | Low | Low |
| 1 | Low | Information |
| 2 | Information | Warning |
| 3 | Caution | Danger |
| 4 | Warning | Danger |
| 5 | Danger | Danger |

FIG.11

| UI LEVEL | DISPLAY OBSTACLE WITHIN VIEWING ANGLE RANGE | DISPLAY OBSTACLE OUT OF VIEWING ANGLE RANGE |
|---|---|---|
| Low | NONE | NONE |
| Information | DISPLAY IT WITH SMALL ICON HIGH TRANSPARENCY | NONE |
| Caution | DISPLAY IT WITH SMALL ICON HIGH TRANSPARENCY | DISPLAY IT TO RECOGNIZE APPROXIMATE DIRECTION OF OBSTACLE POSITION |
| Warning | DISPLAY IT WITH LARGE ICON LOW TRANSPARENCY | DISPLAY IT TO RECOGNIZE APPROXIMATE DIRECTION OF OBSTACLE POSITION |
| Danger | DISPLAY IT WITH LARGE ICON LOW TRANSPARENCY | DISPLAY IT BY ACCURATELY REFLECTING ORIENTATION OF OBSTACLE WITH RESPECT TO USER |

FIG.14

WEARABLE ELECTRONIC DEVICE FOR DISPLAYING OBSTACLE-RELATED INFORMATION, OPERATING METHOD, AND STORAGE MEDIUM

CROSS-REFERENCE TO RELATED APPLICATION(S)

This application is a continuation application, claiming priority under § 365(c), of an International application No. PCT/KR2023/010566, filed on Jul. 21, 2023, which is based on and claims the benefit of a Korean patent application number 10-2022-0096217, filed on Aug. 2, 2022, in the Korean Intellectual Property Office, and of a Korean patent application number 10-2022-0108551, filed on Aug. 29, 2022, in the Korean Intellectual Property Office, the disclosure of each of which is incorporated by reference herein in its entirety.

BACKGROUND

1. Field

The disclosure relates to a wearable electronic device for display obstacle-related information, an operating method, and a storage medium.

2. Description of Related Art

A wearable device is a device in the form of being worn on a body. For example, the wearable device may include a head mounted display (HMD) device worn on the head of a user to display an image in front of the eyes of the user. The HMD device may include smart glasses in the form of eyeglasses.

For example, the wearable device may provide the user with a virtual reality (VR) or augmented reality (AR) environment. The VR environment refers to an environment is created with computer graphics, which has a similar environment to the reality. The AR refers to an environment implemented such that a virtual thing is shown like a thing as if it is present in an original environment by synthesizing the virtual thing or information with an image of a real environment or displaying the virtual thing in the rear environment. For example, the wearable device may provide a VR environment or an AR environment through its display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to a wearable electronic device for display obstacle-related information, an operating method, and a storage medium.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a camera, a display, a microphone, a sensor, a memory storing one or more computer programs, and one or more processors communicatively coupled with the camera, the display, the microphone, the sensor, and the memory, wherein the one or more computer programs include computer-executable instructions that, when executed by the one or more processors individually or collectively, cause the wearable electronic device to determine an environment level indicating a danger degree of a surrounding environment for a user of the wearable electronic device based on an image obtained through the camera, determine whether to use the sensor, the camera, and the microphone depending on the determined environment level, obtain obstacle information and an estimated impulse between an obstacle and the user based on data input through at least one determined to be used among the sensor, the camera, or the microphone, determine a user interface (UI) level for displaying danger of collision between the obstacle and the user based on the environment level, the obstacle information, and the estimated impulse, generate a graphic entity indicating a direction and a danger degree of the obstacle depending on the UI level, and display an obstacle-related UI including the graphic entity on the display.

In accordance with another aspect of the disclosure, a method of operating a wearable electronic device is provided. The method includes determining an environment level indicating a danger degree of a surrounding environment for a user of the wearable electronic device based on an image obtained through a camera, determining whether to use a sensor, the camera, and a microphone depending on the determined environment level, obtaining obstacle information and an estimated impulse between an obstacle and the user based on data input through at least one determined to be used among the sensor, the camera, or the microphone, determining a user interface (UI) level for displaying danger of collision between the obstacle and the user based on the environment level, the obstacle information, and the estimated impulse, generating a graphic entity indicating a direction and a danger degree of the obstacle depending on the UI level, and displaying an obstacle-related UI including the graphic entity on a display.

In accordance with another aspect of the disclosure, one or more non-transitory computer-readable storage media storing computer-executable instructions that, when executed by one or more processors individually or collectively, cause a wearable electronic device to perform operations are provided. The operations include determining an environment level indicating a danger degree of a surrounding environment for a user of the wearable electronic device based on an image obtained through a camera, determining whether to use a sensor, the camera, and a microphone depending on the determined environment level, obtaining obstacle information and an estimated impulse between an obstacle and the user based on data input through at least one determined to be used among the sensor, the camera, or the microphone, determining a user interface (UI) level for displaying danger of collision between the obstacle and the user based on the environment level, the obstacle information, and the estimated impulse, generating a graphic entity indicating a direction and a danger degree of the obstacle depending on the UI level, and displaying an obstacle-related UI including the graphic entity on a display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a drawing illustrating an environment level determination operation of an electronic device according to one or more embodiment of the disclosure;

FIG. 8 is a drawing illustrating an operation of determining whether to use a sensor for each sensor in an electronic device according to one or more embodiments of the disclosure;

FIG. 10 is a drawing illustrating a user equipment (UI) display policy of an electronic device according to a UI level according to an embodiment of the disclosure;

FIG. 11 is a drawing illustrating a UI level determination operation of an electronic device according to one or more embodiment of the disclosure;

FIG. 14 is a drawing illustrating a method for displaying an obstacle-related UI depending on a UI level in an electronic device according to one or more embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
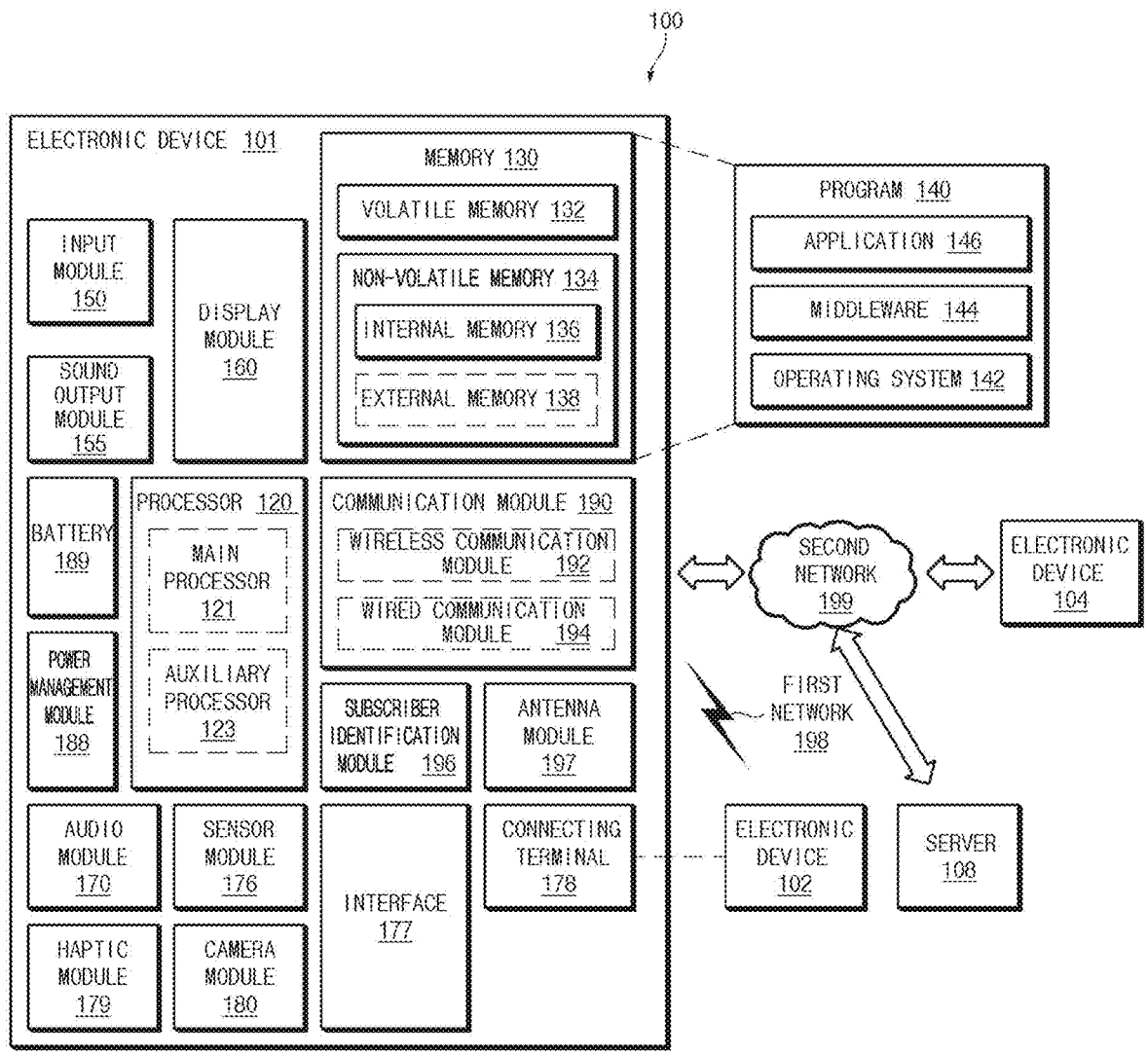
FIG. 1 is a block diagram of an electronic device in a network environment according to one or more embodiments of the disclosure.

FIG. 1 is a block diagram illustrating an electronic device in a network environment according to one or more embodiments of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to one or more embodiments of the disclosure, the electronic device 101 may communicate with the external electronic device 104 via the server 108.

According to one or more embodiments of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to one or more embodiments of the disclosure, the auxiliary processor 123 (e.g., an image signal processor or a communication processor) may be implemented as part of another component (e.g., the camera module 180 or the communication module 190) functionally related to the auxiliary processor 123. According to one or more embodiments of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

For example, the processor 120 may comprise one or more processing circuitry which are individually and/or collectively configured to perform various functions of the present disclosure. As a non-limiting example, at least a portion of the processor 120 may be included in a first chip of the electronic device 101 and at least another portion of the processor 120 may be included in a second chip of the electronic device 101 different from the first chip of the electronic device 101.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments of the disclosure, the display module 160 may include a touch sensor adapted to detect a touch, or a pressure sensor adapted to measure the intensity of force incurred by the touch.

The audio module 170 may convert a sound into an electrical signal and vice versa. According to one or more embodiments of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to one or more embodiments of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to one or more embodiments of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments of the disclosure, the haptic module 179 may include, for example, a motor, a piezoelectric element, or an electric stimulator.

The camera module 180 may capture a still image or moving images. According to one or more embodiments of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to one or more embodiments of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to one or more embodiments of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments of the disclosure, the antenna module 197 may include an antenna including a radiating element including a conductive material or a conductive pattern formed in or on a substrate (e.g., a printed circuit board (PCB)). According to one or more embodiments of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to one or more embodiments of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to one or more embodiments of the disclosure, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to one or more embodiments of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
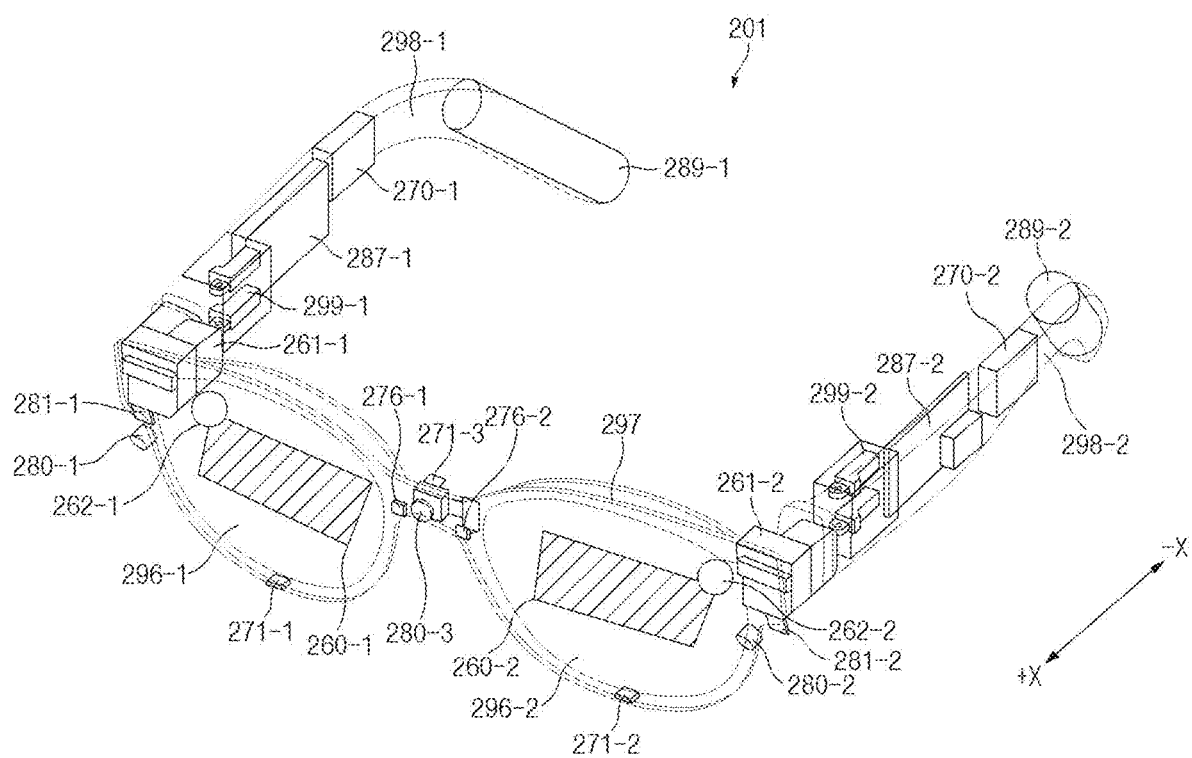
FIG. 2 is a schematic diagram of an electronic device according to one or more embodiments of the disclosure.

FIG. 2 is a schematic diagram of an electronic device according to an embodiment of the disclosure.

Referring to FIG. 2, an electronic device 201 may be referred to as a head mounted display (HMD) device, a wearable device, smart glasses, or an eyewear. The form of the electronic device 201 shown in FIG. 2 is illustrative, and embodiments of the disclosure are not limited thereto. For example, the electronic device 201 may be any electronic device configured to provide augmented reality (AR) or virtual reality (VR).

According to an embodiment of the disclosure, the electronic device 201 may include at least some of the components of the electronic device 101 of FIG. 1. For example, the electronic device 201 may include at least one of a display (e.g., the display module 160 of FIG. 1), a camera (e.g., the camera module 180 of FIG. 1), at least one sensor (e.g., the sensor module 176 of FIG. 1), a processor (e.g., the processor 120 of FIG. 1), a battery (e.g., the battery 189 of FIG. 1), memory (e.g., the memory 130 of FIG. 1), or a communication circuit (e.g., a communication module 190 of FIG. 1). At least some of the components of the electronic device 201 may be located inside a housing of the electronic device 201 or may be exposed to the outside of the housing.

According to one or more embodiments of the disclosure, the electronic device 201 may include the display. For example, the electronic device 201 may include a first display 261-1 and a second display 261-2. The first display 261-1 and/or the second display 261-2 may include at least one of a liquid crystal display (LCD), a digital mirror device (DMD), a liquid crystal on silicon (LCoS) device, a light emitting diode (LED) on silicon (LEDoS) device, an organic light emitting diode (OLED), or a micro light emitting diode (micro LED). For example, the display of the electronic device 201 may include at least one light source for radiating light. When the first display 261-1 and/or the second display 261-2 include(s) one of the LCD, the DMD, or the LCoS device, the electronic device 201 may include at least one light source which radiates light to screen output area(s) 260-1 and/or 260-2 of the display. For another example, when the display of the electronic device 201 internally generates light, it may fail to include a separate light source except for the light source included in the display. When the first display 261-1 and/or the second display 261-2 include(s) at least one of the OLED or the micro LED, the electronic device 201 may provide a user with an image although not including a separate light source. When the display is implemented as the OLED or the micro LED, the weight of the electronic device 201 may be reduced by omitting the separate light source.

According to one or more embodiments of the disclosure, the electronic device 201 may include a first transparent member 296-1 and/or a second transparent member 296-2. For example, when the user wears the electronic device 201, he or she may see through the first transparent member 296-1 and/or the second transparent member 296-2. The first transparent member 296-1 and/or the second transparent member 296-2 may be formed of at least one of a glass plate, a plastic plate, or a polymer and may be transparent or semi-transparent. For example, when worn, the first transparent member 296-1 may be disposed to face a right eye of the user and the second transparent member 296-2 may be disposed to face a left eye of the user.

According to an embodiment of the disclosure, at least a part of the first transparent member 296-1 and/or the second transparent member 296-2 may be a waveguide. For example, the waveguide may deliver an image generated by the display (e.g., the first display 261-1 and/or the second display 261-2) to the eyes of the user. The waveguide may be formed of glass, plastic, or a polymer. For example, the waveguide may include a nano-pattern formed inside or on one surface (e.g., a polygonal or curved grating structure). For example, light incident to one end of the waveguide may be propagated to the inside of the waveguide by the nano-pattern to be provided to the eyes of the user. For example, the waveguide configured with a free-form prism may be configured to provide the user with the incident light through a reflective mirror.

According to an embodiment of the disclosure, the waveguide may include at least one diffractive element (e.g., a diffractive optical element (DOE) or a holographic optical element (HOE)) or a reflective element (e.g., a reflective mirror). The waveguide may guide display light emitted from a light source unit to the eyes of the user using the at least one diffractive element or the reflective element included in the waveguide. For example, the diffractive element may include an input optical member (e.g., 262-1 and/or 262-2) and/or an output optical member (not shown). The first input optical member 262-1 and/or the second input optical member 262-2 may be referred to as an input grating area and the output optical member (not shown) may be referred to as an output grating area. The input grating area may diffract or reflect light to deliver light output from the light source (e.g., the micro LED) to the transparent member (e.g., the first transparent member 296-1 and/or the second transparent member 296-2) of the screen display unit. The output grating area may diffract or reflect light delivered to the transparent member (e.g., the first transparent member 296-1 and/or the second transparent member 296-2) of the waveguide in the direction of the eyes of the user. For example, the reflective element may include a total internal reflection (TIR) optical element or a TIR wave guide for TIR. The TIR may be referred to as one scheme for guiding light and may refer to generating an incident angle to reflect 100% of light (e.g., an image) input through the input grating area from one surface (e.g., a specific surface) of the waveguide, such that 100% is delivered to the output grating area. In an example, an optical path of light emitted from the display may be guided to the waveguide by the input optical member. Light which moves in the waveguide may be guided in the direction of the eyes of the user through the output optical member. Screen output areas 260-1 and/or 260-2 may be determined based on the light emitted in the direction of the eyes.

The description is given that the electronic device 201 provides the user with the image using the waveguide in FIG. 2, but one or more embodiments of the disclosure is not limited thereto. For example, the display of the electronic device 201 may be a transparent or semi-transparent display. In this case, the display may be disposed at a position (e.g., the first screen output area 260-1 and/or the second screen output area 260-2) facing the eyes of the user.

According to an embodiment of the disclosure, the electronic device 201 may include at least one camera. For example, the electronic device 201 may include a first camera 280-1, a second camera 280-2, and/or a third camera 280-3. For example, the first camera 280-1 and the second camera 280-2 may be used to recognize an external image. The first cameras 280-1 and the second camera 280-2 may be configured to obtain an image corresponding to a direction (e.g., an +x direction) corresponding to a gaze of the user. The electronic device 201 may perform head tracking (e.g., 3 or 6 degrees of freedom (DoF) tracking), hand image detection, hand image tracking, and/or space recognition using the first camera 280-1 and the second camera 280-2. For example, the first camera 280-1 and the second camera 280-2 may be global shutter (GS) cameras with the same specification and performance (e.g., an angle of view, a shutter speed, resolution, a color bit depth, and/or the like). The electronic device 201 may support a simultaneous localization and mapping (SLAM) technology by performing space recognition (e.g., 6 DoF space recognition) and/or depth information acquisition using a stereo camera disposed at the left/right. Furthermore, the electronic device 201 may recognize a gesture of the user using the stereo camera disposed at the left/right. The electronic device 201 may detect a faster hand gesture and fine motion by using a GS camera having relatively less distortion than a rolling shutter (RS) camera. For example, the third camera 280-3 may be used to recognize an external image. The third camera, 280-3 may be configured to obtain an image corresponding to a direction (e.g., a +x direction) corresponding to a gaze of the user. In an example, the third camera 280-3 may be a camera having relatively higher resolution than the first camera 280-1 and the second camera 280-2. The third camera 280-3 may be referred to as a high resolution (HR) camera or a photo video (PV) camera. The third camera 280-3 may support functions, such as auto focus (AF) and/or optical image stabilization (OIS), for obtaining a high-definition image. The third camera 280-3 may be a GS camera or an RS camera.

According to an embodiment of the disclosure, the electronic device 201 may include at least one eye-tracking sensor. For example, the electronic device 201 may include a first eye-tracking sensor 276-1 and a second eye-tracking sensor 276-2. The eye-tracking sensor 276-1 and the second eye-tracking sensor 276-2 may be, for example, cameras configured to obtain images in directions corresponding to the eyes of the user. The first eye-tracking sensor 276-1 and the second eye-tracking sensor 276-2 may be configured to respectively obtain a right-eye image of the user and a left-eye image of the user. The electronic device 201 may to configured to detect pupils of the user using the first eye-tracking sensor 276-1 and the second eye-tracking sensor 276-2. The electronic device 201 may obtain a gaze of the user from a pupil image of the user and may provide an image based on the obtained gaze. For example, the electronic device 201 may display the image such that the image is located in a gaze direction of the user. For example, the first eye-tracking sensor 276-1 and the second eye-tracking sensor 276-2 may be global shutter (GS) cameras with the same specification and performance (e.g., an angle of view, a shutter speed, resolution, a color bit depth, and/or the like).

According to an embodiment of the disclosure, the electronic device 201 may include at least one illumination unit. The illumination unit may include, for example, at least one LED. In FIG. 2, the electronic device 201 may include a first illumination unit 281-1 and a second illumination unit 281-2. The electronic device 201 may provide, for example, auxiliary illumination for the first camera 280-1, the second camera 280-2, and/or the third camera 280-3 using the first illumination unit 281-1 and the second illumination unit 281-2. In an example, the electronic device 201 may provide illumination for obtaining a pupil image using the illumination unit (not shown). For example, the electronic device 201 may provide illumination for the eye-tracking sensor using an infrared wavelength LED. In this case, the eye-tracking sensor may include an image sensor for obtaining an infrared wavelength image.

According to an embodiment of the disclosure, the electronic device 201 may include at least one printed circuit board (PCB). For example, the electronic device 201 may include a first PCB 287-1 located at a first temple 298-1 and a second PCB 287-2 located at a second temple 298-2. The first PCB 287-1 and/or the second PCB 287-2 may be electrically connected with other components of the electronic device 201 through a signal line and/or a flexible PCB (FPCB). For example, the communication circuit, the memory, the at least one sensor, and the processor may be disposed on the first PCB 287-1 and/or the second PCB 287-2. For example, each of the first PCB 287-1 and the second PCB 287-2 may be configured with a plurality of PCBs spaced apart from each other by an interposer.

According to an embodiment of the disclosure, the electronic device 201 may include at least one battery. For example, the electronic device 201 may include a first battery 289-1 located at one end of the first temple 298-1 and a second battery 289-2 located at one end of the second temple 298-2. The first battery 289-1 and the second battery 289-2 may be configured to supply power to the components of the electronic device 201.

According to an embodiment of the disclosure, the electronic device 201 may include at least one speaker. For example, the electronic device 201 may include a first speaker 270-1 and a second speaker 270-2. The electronic device 201 may be configured to provide a stereo sound using speakers located at the left and the right.

According to an embodiment of the disclosure, the electronic device 201 may include at least one microphone. For example, the electronic device 201 may include a first microphone 271-1, a second microphone 271-2, and/or a third microphone 271-3. The first microphone 271-1 may be located at the right of a frame 297, the second microphone 271-2 may be located at the left of the frame 297, and the third microphone 271-3 may be located at a bridge of the frame 297. In an example, the electronic device 201 may perform beamforming using the first microphone 271-1, the second microphone 271-2, and/or the third microphone 271-3.

According to an embodiment of the disclosure, the electronic device 201 may include the first temple 298-1, the temple 298-2, and the frame 297. The first temple 298-1, the second temple 298-2, and the frame 297 may be referred to as the housing. The first temple 298-1 may be physically connected with the frame 297 through a first hinge part 299-1 and may support the frame 297 when worn. The second temple 298-2 may be physically connected with the frame 297 through a second hinge part 299-2 and may support the frame 297 when worn.

The above-mentioned configuration of the electronic device 201 is illustrative, and embodiments of the disclosure are not limited thereto. For example, the electronic device 201 may fail to include at least some of the components described in conjunction with FIG. 2 or may further include another component other than the described components. For example, the electronic device 201 may determine at least one sensor (e.g., an acceleration sensor, a gyro sensor, a touch sensor, and/or the like) and/or an antenna.

Figure 3:
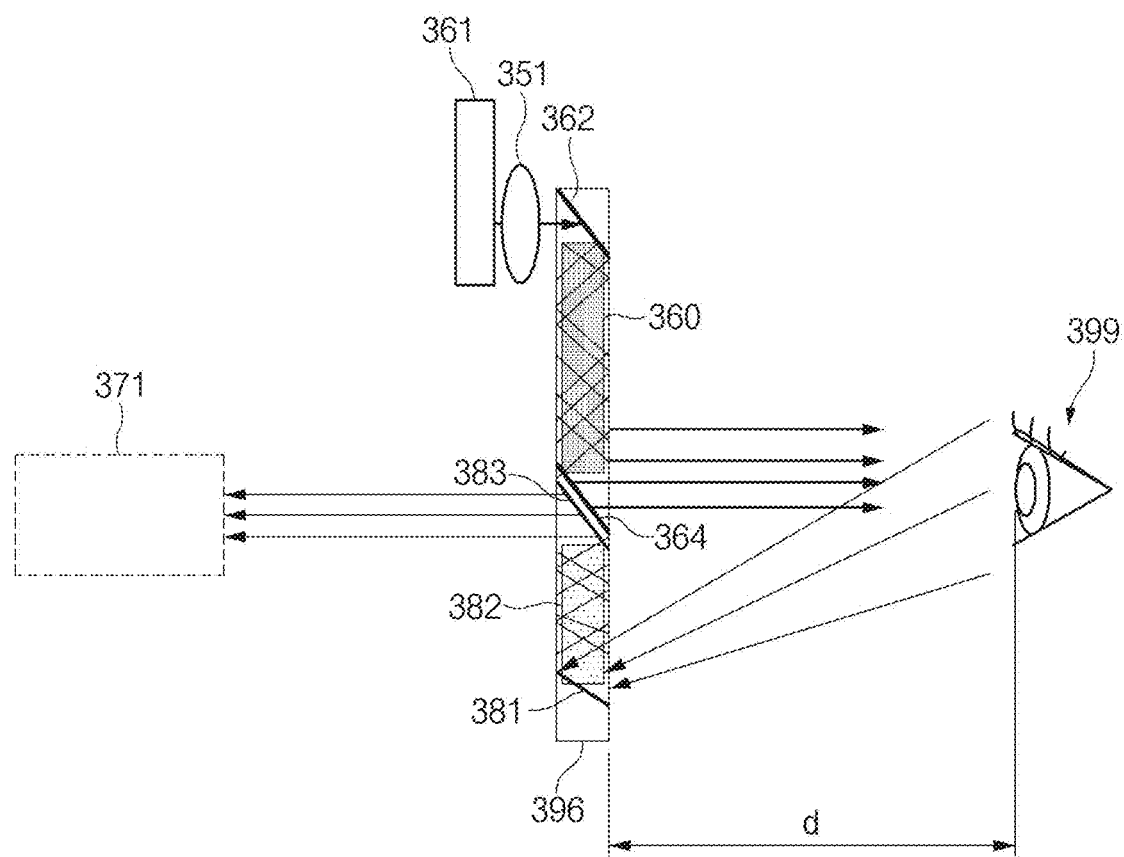
FIG. 3 is a schematic diagram of an eye tracking and display method through a transparent member according to one or more embodiments of the disclosure.

FIG. 3 is a schematic diagram of an eye tracking and display method through a transparent member according to an embodiment of the disclosure.

Referring to FIG. 3, a display 361 (e.g., a first display 261-1 or a second display 261-2 of FIG. 2) may provide an image through a transparent member 396 (e.g., a first transparent member 296-1 or a second transparent member 296-2 of FIG. 2). According to an embodiment of the disclosure, the display 361 may input light corresponding to the image to an input optical member 362 (e.g., a first input optical member 262-1 or a second input optical member 262-2 of FIG. 2) through a lens 351. The input optical member 362 may reflect or diffract and input incident light to a waveguide 360. An output optical member 364 may output light delivered through the waveguide 360 in the direction of an eye 399 of the user. In an example, the lens 351 may be included in the display 361. In an example, the position of the lens 351 may be determined based on a distance between the transparent member 396 and the eye 399 of the user.

According to one or more embodiments of the disclosure, an eye-tracking sensor 371 (e.g., a first eye-tracking sensor 276-1 or a second eye-tracking sensor 276-2 of FIG. 2) may obtain an image corresponding to at least a part of the eye 399 of the user. For example, the light corresponding to the image of the eye 399 of the user may be reflected or diffracted and input to the waveguide 382 through a first splitter 381. Light delivered to a second splitter 383 through the waveguide 382 may be reflected and/or diffracted and output in the direction of the eye-tracking sensor 371 by the second splitter 383.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter a description will be given of a configuration and an operation of an electronic device according to one or more embodiments with reference to FIG. 4.

Figure 4:
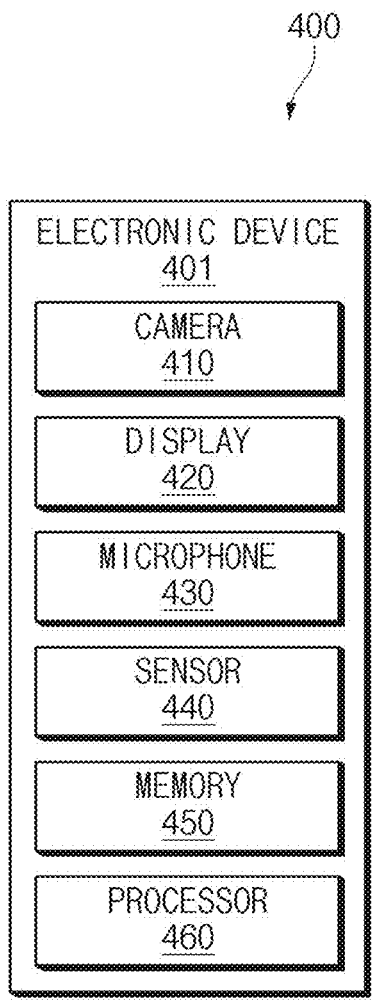
FIG. 4 is a block diagram of an electronic device according to one or more embodiments of the disclosure.

FIG. 4 is a block diagram 400 of an electronic device according one or more embodiments of the disclosure.

Referring to FIG. 4, the electronic device 401 (e.g., the electronic device 101 of FIG. 1 or an electronic device 201 of FIG. 2) may include a camera 410 (e.g., the camera module 180 of FIG. 1 or camera(s) 280-1, 280-2, and/or 280-3 of FIG. 2), and/or an eye-tracking sensor (e.g., eye-tracking sensors 276-1 and 276-2 of FIG. 2), a display 420 (e.g., the display module 160 of FIG. 1 or display(s) 261-1 and/or 261-2 of FIG. 2), a microphone 430 (e.g., the input module 150 of FIG. 1 or microphone(s) 271-1, 271-2, and/or 271-3 of FIG. 2), a sensor 440 (e.g., the sensor module 176 of FIG. 1), memory 450 (e.g., the memory 130 of FIG. 1), and a processor 460 (e.g., the processor 120 of FIG. 1).

According to one or more embodiments of the disclosure, the electronic device 401 may be a wearable device capable of being worn on at least a part (e.g., a head) of the body of the user. The electronic device 401 may provide the user (or a wearer) with an augmented reality (AR) environment. For example, the electronic device 401 may synthesize and display a virtual image with a real image on the display 420 disposed in front of eyes of the user to provide the AR environment. For example, the real image may be an image of an environment around the electronic device 401 or the user of the electronic device 401, which is captured through the camera 410, or may be an image recognized by the eyes of the user through the transparent or semi-transparent display 420.

According to one or more embodiments of the disclosure, the camera 410 may obtain the image of the environment around the electronic device 401 or the user of the electronic device 401. For example, the camera 410 may obtain an image corresponding to a gaze direction of the user, in a state in which the user wears the electronic device 401 on his or her head. The image corresponding to the gaze direction of the user may be an image in which the camera 410 captures a direction the user faces or a direction the user looks at.

For example, the camera 410 may include a plurality of cameras. A viewing angle of each of the plurality of cameras may cover at least a portion of a viewing angle of the user. Each of the plurality of cameras may be provided to have a different image capture area. For example, the camera 410 may be installed to face the center, the left, and the right of the electronic device 401. The electronic device 401 may recognize an obstacle approaching from the rear of the user through a left camera and a right camera. For example, the camera 410 may include a central camera with a wide viewing angle capable of covering left and right viewing angles.

The camera 410 may be used to recognize a surrounding obstacle. The obstacle in the disclosure may be referred to as an entity (e.g., a person, an animal and plant, or an object) which has its form and volume to be present in a real environment. The obstacle may refer to a thing capable of applying an impact when colliding with the user. The processor 460 may recognize an obstacle by object recognition and/or distance recognition for one or more images input through the camera 410. For example, the processor 460 may identify a position and/or a type of the obstacle by the object recognition for the one or more images input through the camera 410. The processor 460 may recognize a distance to the obstacle by the distance recognition for the one or more images input through the camera 410.

For example, the camera 410 may include a depth recognition camera. The depth recognition camera may be used to identify the distance to the obstacle. The depth recognition camera may be a camera configured to obtain depth information of a surrounding environment based on a binocular disparity and/or a time of flight (ToF). Depth recognition may be performed using images obtained using the plurality of cameras rather than the depth recognition camera.

According to one or more embodiments of the disclosure, the display 420 may visually provide the user with information. For example, the display 420 may be disposed to face the eyes of the user in the state in which the user wears the electronic device 401 on his or her head. The display 420 may provide augmented reality content. The augmented reality content may be displayed on the display 420 in a graphic form. The display 420 may provide a graphic user interface (GUI) as augmented reality content. The augmented reality content or the GUI may be provided by one or more applications stored in the electronic device 401. The application may include, for example, an obstacle collision warning application.

According to one or more embodiments of the disclosure, the microphone 430 may receive a sound (or an audio) around the electronic device 401. For example, the microphone 430 may receive a sound generated from the electronic device 401 or the user who wears on the electronic device 401 and an obstacle around the user. The microphone 430 may include a plurality of microphones. The distance of the obstacle may be predicted (or calculated) using a disparity of the sound input to each of the plurality of microphones. The direction of the obstacle may be predicted based on a position at which a microphone to which the sound of the obstacle is input among the plurality of microphones is mounted on the electronic device 401.

According to one or more embodiments of the disclosure, the sensor 440 may detect a posture or motion of the electronic device 401 or the user who wears the electronic device 401. The sensor 440 may include at least one of, for example, an accelerometer sensor, a gyroscope sensor, or an earth magnetic field sensor. How fast the electronic device 401 or the user is moving at any speed in any direction may be identified based on the posture and/or the motion of the electronic device 401 or the user, which are/is detected by the sensor 440.

According to one or more embodiments of the disclosure, the memory 450 may store one or more instructions for driving the electronic device 401 and the application. The memory 450 may store data or information necessary to run the application. For example, the application may include an obstacle collision warning application.

According to one or more embodiments of the disclosure, the processor 460 may be operatively connected with the camera 410, the display 420, the microphone 430, the sensor 440, and the memory 450. Being operatively connected between the components may mean that the components are functionally connected with each other or are communicatively connected with each other. For example, the component operatively connected with each other may transmit and receive data with each other.

The processor 460 may execute the one or more instructions stored in the memory 450. For example, the processor 460 may execute the one or more instructions stored in the memory 450 to run the obstacle collision warning application.

The processor 460 may obtain the image of the environment around the electronic device 401 or the user who wears the electronic device 401 through the camera 410. The processor 460 may perform image classification for the image obtained through the camera 410 to determine a category to which the image belongs. An artificial intelligence-based algorithm may be used for the image classification. The category may include one or more categories associated with the surrounding environment. For example, the category may include, but is not limited to, at least one of a category classified according to whether it is the inside/outside, a category classified by analysis of a vehicle-related element, or a category classified according to obstacle complexity.

The processor 460 may classify the image obtained through the camera 410 based on at least one of whether it is the inside or the outside, the analysis of the vehicle-related element, or the obstacle complexity.

The processor 460 may classify the image as an indoor image or an outdoor image.

The processor 460 may perform scene analysis for the image obtained through the camera 410 to analyze a vehicle-related element. For example, the processor 460 may classify the image as at least one of an image of a sidewalk not adjacent to a driveway, an image of a sidewalk adjacent to the driveway, or an image of the driveway, a crossing, or a crosswalk.

The processor 460 may determine the obstacle complexity for the image obtained through the camera 410. For example, the obstacle complexity may be determined based on a situation in which a progress path of the user is disturbed or the speed of the user is reduced. The obstacle complexity may include at least one of, for example, the number of obstacles, whether the obstacles move, or distribution of the obstacles. For example, the processor 460 may classify the image as an image with few obstacles or an image with many obstacles. The processor 460 may classify the image as the image with the many obstacles, when the number of the obstacles identified in the image is greater than or equal to a specified number, and may classify the image as the image with the few obstacles, when the number of the obstacles is less than the specified number.

For example, the processor 460 may perform the image classification stage by stage. When the image obtained through the camera 410 is classified as the indoor image, the processor 460 may omit the image classification based on the analysis of the vehicle-related element and the obstacle complexity. When the image obtained through the camera 410 is classified as the image of the sidewalk adjacent to the driveway or the image of the driveway, the crossing, or the crosswalk, the processor 460 may omit the image classification based on the obstacle complexity.

The processor 460 may determine an environment level based on the image obtained through the camera 410. The processor 460 may determine an environment level based on the result of the image classification of the image obtained through the camera 410. The environment level may indicate a danger degree of a surrounding environment for the user who wears the electronic device 401. For example, as the environment level is higher, the processor 460 may determine that a probability that the user will be shocked by the obstacle is relatively higher.

The processor 460 may determine an environment level based on the one or more categories determined by the image classification. For example, the processor 460 may determine the environment level based on at least one of the category classified according to whether it is the inside/outside, the category classified by the analysis of the vehicle-related element, or the category classified according to the obstacle complexity. The processor 460 may determine the environment level corresponding to the one or more categories determined by the image classification for the image obtained through the camera 410, based on information about an environment level which is predetermined in response to the one or more categories. The information about the environment level which is predetermined in response to the one or more categories may be stored in the memory 450 and may be used when the processor 460 determines the environment level.

For example, the processor 460 may determine the environment level to be relatively higher when classified as the outdoor image than when classified as the indoor image. The processor 460 may determine the environment level to be relatively higher when classified as the image of the sidewalk adjacent to the driveway than when classified as the image of the sidewalk not adjacent to the driveway. The processor 460 may determine the environment level to be relatively higher when classified as the image of the driveway, the crossing, or the crosswalk than when classified as the image of the sidewalk adjacent to the driveway. The processor 460 may determine the environment level to be relatively higher when classified as the image with the many obstacles than when classified as the image with the few obstacles.

The processor 460 may correct the environment level based on a motion speed of the electronic device 401 or the user who wears the electronic device 401. For example, as an impulse capable of being applied to the user by a surrounding obstacle is relatively higher when the electronic device 401 or the user moves at a specified speed or more than when the electronic device 401 or the user does not move or moves at less than the specified speed, there is a need for the electronic device 401 to inform the user of danger faster. When the motion speed of the electronic device 401 or the user who wears the electronic device 401 is greater than or equal to the specified speed, the processor 460 may correct the environment level determined by the image classification to be high. When the motion speed of the electronic device 401 or the user who wears the electronic device 401 is less than the specified speed, the processor 460 may correct the environment level determined by the image classification to be low.

The processor 460 may determine whether to use a sensor for each sensor depending on the determined environment level. The processor 460 may determine whether to use a sensor for each sensor according to the environment level determined by the image classification for the image obtained through the camera 410, based on information about whether to use a sensor for each sensor, which is predetermined in response to the environment level. The information about whether to use the sensor for each sensor, which is predetermined in response to each environment level, may be stored in the memory 450 and may be used when the processor 460 determines whether to use the sensor for each sensor. Herein, the sensor may be the concept of including the sensor 440, the camera 410, and the microphone 430. The processor 460 may determine whether to use the sensor 440 (e.g., an inertial measurement unit (IMU) sensor), the camera 410 (e.g., a vision camera and/or a depth camera (or a depth recognition camera)), and the microphone 430.

For example, as the user is in a more dangerous environment, there is a need to accurately calculate an estimated impulse using more sensors or a more precise sensor. For example, as the environment level is higher, the processor 460 may determine to use a larger number of (e.g., more types of) sensors. For example, when determined as a lowest first environment level, the processor 460 may determine not to use all the sensor 440, the camera 410, and the microphone 430. For example, when determined as a second environment level higher than the first environment level, the processor 460 may determine to use the sensor 440 and the camera 410 and not to use the microphone 430. For example, when determined as a third environment level higher than the second environment level, the processor 460 may determine to use all the sensor 440, the camera 410, and the microphone 430.

For example, the processor 460 may determine whether to use an inertial measurement unit (IMU) sensor, a vision camera, a depth camera, and a microphone depending on the environment level. For example, the processor 460 may determine to use the IMU sensor and the vision camera in all cases all except for the case in which it is determined as the lowest environment level. When the environment level becomes higher, the processor 460 may determine to more use the depth camera than the IMU sensor and the vision camera. The depth camera may be used to more accurately recognize a distance from an obstacle. When the environment level becomes higher, the processor 460 may determine to more use the microphone than the IMU sensor, the vision camera, and the depth camera. The processor 460 may predict (or recognize) a distance of the obstacle using a disparity of a sound input to each of the plurality of microphones mounted on the electronic device 401. The processor 460 may recognize a sound and/or a distance of the obstacle approaching the user through the microphone 430 to detect danger of a range which is not recognized by the user and the camera 410.

For example, as the environment level becomes higher, the processor 460 may determine not to use a specific sensor. For example, the depth camera may consume much power to obtain depth information of higher resolution. When the environment level is greater than or equal to a specified level, the processor 460 may determine not to use the specific sensor (e.g., the IMU sensor or the microphone) to reduce power consumed by the specific sensor. The processor 460 may obtain high-resolution depth information using the depth camera using the reduced power. The processor 460 may more precisely and accurately calculate a distance to the obstacle based on the high-resolution depth information.

The method for determining whether to use the sensor for each sensor in the processor 460 is not limited to the above-mentioned method. The processor 460 may variously determine whether to use a sensor for each sensor depending on the environment level and the necessity of a function of each sensor.

The processor 460 may obtain obstacle information using at least one determined to be used among the sensor 440, the camera 410, or the microphone 430. The processor 460 may obtain obstacle information based on data input through the at least one determined to be used among the sensor 440, the camera 410, or the microphone 430. The obstacle information may include information associated with affecting safety of the user. The obstacle information may include, for example, a type of an obstacle, a direction of the obstacle, a distance to the obstacle, and/or a speed of the obstacle in the direction of the user. For example, the obstacle information may include collision probability information between the obstacle and the user, which is determined based on a movement path of the obstacle and a movement path of the user.

The processor 460 may perform object recognition for the image obtained through the camera 410 to recognize the object. The processor 460 may perform object recognition and/or distance recognition for the image obtained through the camera 410 to obtain obstacle information. For example, the processor 460 may perform the object recognition for the image obtained through the camera 410 to predict (or calculate) a position and/or a type of the obstacle. For example, the processor 460 may perform the distance recognition for the image obtained through the camera 410 to predict (or calculate) a distance to the obstacle. An artificial intelligence-based algorithm may be used for the object recognition and/or the distance recognition for the image.

The processor 460 may calculate the distance to the obstacle as a specified time interval. The processor 460 may obtain a posture and/or a speed of the electronic device 401 or the user who wears the electronic device 401 using the sensor 440. The processor 460 may calculate a speed of the obstacle in the direction of the user based on the distance (e.g., $d_0, d_1, d_2, d_3, \ldots,$ and $d_n$ (where n is 1 or more natural numbers)) to the obstacle, which is calculated at intervals of a specified time (e.g., t). For example, the processor 460 may calculate the speed of the obstacle in the direction of the user as $(d_n-d_0)/(n \times t)$. $n \times t$ may refer to a movement time of the obstacle. When calculating the speed of the obstacle in the direction of the user, the processor 460 may refer to speed information of the user, which is obtained using the sensor 440. For example, the processor 460 may calculate a relative speed using the speed information of the obstacle and the speed information of the user to calculate a speed of the obstacle in the direction of the user.

The processor 460 may identify (e.g., calculate) a direction of the obstacle (e.g., a relative direction of the obstacle to the electronic device 401 or the user), based on the position of the obstacle, which is calculated based on the image obtained through the camera 410. In an example, when calculating the direction of the obstacle, the processor 460 may refer to posture information of the electronic device 401 or the user, which is obtained using the sensor 440. The processor 460 may determine a direction the electronic device 401 or the user faces (e.g., a direction the user faces, a front direction of the electronic device 401, or a center direction of a field of view (FOV) of the camera 410) based on the posture information of the electronic device 401 or the user. For example, the processor 460 may calculate the direction of the obstacle based on the direction the electronic device 401 or the user faces.

The processor 460 may obtain an estimated impulse between the obstacle and the user based on the obstacle information. The processor 460 may obtain an estimated impulse caused by the obstacle based on the obstacle information. The estimated impulse may be a value for predicting whether the obstacle may have some impulses on the user when the obstacle and the user collides with each other. The estimated impulse may be represented as various numerical numbers. For example, it may be represented through a standard unit, such as kg-m/s, or may be represented as criticality (e.g., a value between 0 and 100) for the user. The estimated impulse may be a relative value used in the obstacle collision warning application of the disclosure.

For example, the processor 460 may fail to accurately recognize a weight of the obstacle. The processor 460 may previously store (or set) a specified coefficient in conjunction with the weight depending on the type of the obstacle and may correct the estimated impulse using the specified coefficient. For example, the processor 460 may multiply the speed of the obstacle by the specified coefficient corresponding to the type of the obstacle to calculate the estimated impulse.

The processor 460 may display the obstacle information and/or information associated with the estimated impulse on the display 420. For example, the processor 460 may display a user interface (UI) including the obstacle information and/or the information associated with the estimated impulse. In the disclosure, the user interface including the obstacle information and/or the information associated with the estimated impulse may be referred to as an obstacle-related UI. The obstacle-related UI may be a UI for providing a notification of danger of collision between the obstacle and the user. The obstacle-related UI may include a graphic entity indicating a direction and/or a danger degree of the obstacle. The processor 460 may generate the graphic entity indicating the direction and/or the danger degree of the obstacle. The processor 460 may display the obstacle-related UI including the generated graphic entity.

The obstacle-related UI may be provided by the obstacle collision warning application. The obstacle collision warning application may be resident on the memory 450 in the form of a program instruction. The processor 460 may execute the obstacle collision warning application depending on executing the instructions. The processor 460 may display the obstacle-related UI on the display 420 as a UI of the obstacle collision warning application.

The processor 460 may display UIs of a plurality of applications at the same time on the display 420. The processor 460 may display a UI of an application different from the obstacle collision warning application together. For example, when another UI is displayed, information of the obstacle-related UI may be covered by the other UI. When there is a high possibility that danger will occur to the user, there is a need to emphasize the obstacle-related UI to the user in a such manner as to display it in front of (or above) the other UI or not to display the other UI. The processor 460 may differently set a relationship between the obstacle-related UI and the other UI depending on the UI level. The UI level may correspond to a danger level of the user. The higher the danger level the user is facing, the higher the UI level may be.

For example, the processor 460 may be configured not to display the obstacle-related UI in a first UI level which is the lowest UI level. The processor 460 may be configured to display the obstacle-related UI behind (or below) a second UI level higher than the first UI level. The obstacle-related UI may be covered by another UI in the second UI level. The processor 460 may be configured to display the obstacle-related UI in front of (or above) a third UI level higher than the second UI level. The other UI may be covered by the obstacle-related UI in the third UI level. The processor 460 may be configured not to display the other UI in a fourth UI level higher than the third UI level. The processor 460 may hide the display of the other UI in the fourth UI level. Only the obstacle-related UI may be displayed in the fourth UI level.

The processor 460 may differently set whether it is possible to set whether to display the obstacle-related UI based on a user input, depending on the UI level. For example, the processor 460 may be configured to set whether to display the obstacle-related UI based on a user input in a UI level lower than the specified UI level. For example, when it is possible to set whether to display the obstacle-related UI based on the user input, the processor 460 may determine whether to display the obstacle-related UI based on the user input regardless of the UI level. The processor 460 may fail to display the obstacle-related UI although it should display the obstacle-related UI depending on the UI level in response to receiving a user input not to display the obstacle-related UI. The processor 460 may display the obstacle-related UI in response to receiving the user input to display the obstacle-related UI.

The processor 460 may be configured not to set whether to display the obstacle-related UI based on the user input in a UI level which is greater than or equal to the specified UI level. For example, when it is impossible to set whether to display the obstacle-related UI based on the user input, the processor 460 may determine whether to display the obstacle-related UI depending on the UI level.

A behavior pattern of at least one of whether it is possible to set whether to display the obstacle-related UI based on the user input or a relationship between the obstacle-related UI and another UI may vary with the UI level. Information about whether it is possible to set whether to display the obstacle-related UI based on the user input and information about the relationship between the obstacle-related UI and the other UI, which correspond to each UI level, may be stored in the memory 450. The processor 460 may display the obstacle-related UI depending on a UI display policy corresponding to the determined UI level, based on the stored information.

The UI display policy defined according to the UI level is not limited to that described above. For example, the processor 460 may differentially set transparency of the obstacle-related UI depending on the UI level. The processor 460 may be configured such that the transparency of the obstacle-related UI becomes lower as the UI level becomes higher. For another example, when receiving a user input set not to display the obstacle-related UI in a relatively high UI level, in even a UI level range in which it is possible to set whether to display the obstacle-related UI based on the user input, the processor 460 may be configured to provide a notification of requesting the user to verify it again or a notification of recommending changing the obstacle-related UI to be displayed.

The processor 460 may determine a UI level based on at least one of the environment level, the obstacle information, or the estimated impulse. The processor 460 may determine a minimum level and a maximum level of the UI level depending on the environment level. The processor 460 may determine the minimum level and the maximum level of the UI level according to the environment level determined by the image classification for the image obtained through the camera 410, based on the information about the minimum UI level and the maximum UI level corresponding to the environment level. The information about the minimum UI level and the maximum UI level corresponding to each environment level may be stored in the memory 450 and may be used when the processor 460 determines the UI level.

The processor 460 may determine a UI level within a range by the minimum level and the maximum level based on the obstacle information and the estimated impulse. The processor 460 may determine the UI level within the range by the minimum level and the maximum level based on the obstacle information. The processor 460 may determine the UI level within the range by the minimum level and the maximum level based on the type of the obstacle, the distance to the obstacle, or the speed of the obstacle. For example, the processor 460 may determine a higher UI level when the obstacle is a vehicle than the obstacle is not the vehicle. For example, as the distance to the obstacle is closer, the processor 460 may determine a higher UI level. For example, as the speed of the obstacle is faster, the processor 460 may determine a higher UI level. The description is given above of the method for determining the UI level based on each of the several pieces of obstacle information in the processor 460, but not limited thereto. The processor 460 may combine the several pieces of obstacle information to determine a UI level and may determine a UI level based on another obstacle information except for the above-mentioned obstacle information.

The processor 460 may determine the UI level within the range by the minimum level and the maximum level based on the estimated impulse. As the estimated impulse is higher, the processor 460 may determine a higher UI level.

The processor 460 may correct the minimum level and the maximum level of the UI level based on a user input. The processor 460 may provide the minimum level and the maximum level of the UI level stored in the memory 450 as default values and may change the range of the UI level corresponding to the environment level based on the user input. For example, the processor 460 may receive a user input for adjusting the minimum level or the maximum level of the UI level determined according to the environment level. The processor 460 may adjust the minimum level or the maximum level of the UI level in response to the user input.

When the adjusted minimum level or maximum level is lower than the specified level, the processor 460 may provide a guide for a UI recommended according to the environment level. A specified UI level corresponding to a condition in which the guide for the recommended UI level is provided may be determined for each environment level or each UI level. For example, the higher the environment level, the higher the specified UI level may be set to be. Alternatively, the higher the minimum level or the maximum level of the UI level before being adjusted, the higher the specified UI level which is criteria of adjustment may be set to be.

The processor 460 may differently display the obstacle depending on the UI level. The processor 460 may display the obstacle within a viewing angle range as an icon. For example, as the UI level is higher, the processor 460 may more increase a size of the icon. For example, as the UI level is higher, the processor 460 may more decrease transparency of the icon. The processor 460 may display an obstacle out of the viewing angle range to recognize an orientation of the obstacle. For example, the processor 460 may display an approximate direction of the obstacle in the first UI level and may display an accurate orientation of the obstacle in the second UI level higher than the first UI level. In the disclosure, the viewing angle may correspond to an area which is displayed on the display 420 or an area captured by the specific camera.

The processor 460 may generate a graphic entity depending on the determined UI level. The graphic entity may indicate the direction and the danger degree of the obstacle. The processor 460 may generate a graphic entity depending on the UI display policy defined according to the UI level and may display an obstacle-related UI including the generated graphic entity on the display 420. As the UI level is higher, the processor 460 may more accurately indicate the direction of the obstacle. For example, the processor 460 may display the orientation of the obstacle in four front, rear, left, and right directions in the first UI level and may subdivide the orientation of the obstacle into 8 directions, 16 directions, or 32 directions in the second UI level higher than the first UI level.

The processor 460 may generate a graphic entity based on the obstacle information and the estimated impulse. The processor 460 may differently determine transparency and a color of the graphic entity depending on the danger degree of the obstacle, which is determined based on the obstacle information and the estimated impulse. As the distance to the obstacle is closer, the speed of the obstacle in the direction of the user is higher, and the estimated impulse is larger, the processor 460 may determine that the danger degree of the obstacle is higher. As the danger degree of the obstacle is higher, the processor 460 may determine the transparency of the graphic entity corresponding to the obstacle as being lower. As the danger degree of the obstacle is higher, the processor 460 may determine the color of the graphic entity corresponding to the obstacle as a more striking color. As the danger degree of the obstacle is higher, the processor 460 may determine the size of the graphic entity corresponding to the obstacle as being larger.

The processor 460 may determine a size of the graphic entity or the number of graphic entities depending on the size of the obstacle. For example, as the size of the obstacle is larger, the processor 460 may determine the size of the graphic entity as being larger or may determine the number of the graphic entities as being large. For example, that the size of the graphic entity increases may include that a direction range indicated by the graphic entity widens.

For example, immediately performing danger indications for all obstacles may help to prevent danger of the user, but may allow the user to cause discomfort and fatigue and may increase resources and power consumption of the electronic device 401. The processor 460 may differently set a danger recognition time depending on the UI level and may cancel or suspend a danger indication for the corresponding obstacle, when the user recognizes the obstacle within the danger recognition time. When the user does not recognize the obstacle within the danger recognition time, the processor 460 may maintain or start the danger indication for the corresponding obstacle.

For example, the processor 460 may display an obstacle-related UI and may control such that the obstacle-related UI is not displayed when it is determined that the user recognizes the obstacle within the set danger recognition time. For another example, when it is determined that the user recognizes the obstacle within the danger recognition time in a state in which the obstacle-related UI is not displayed, the processor 460 may suspend displaying the obstacle-related UI. When it is determined that the user recognizes the obstacle, the processor 460 may initialize the danger recognition time. The processor 460 may display the obstacle-related UI or may suspend displaying the obstacle-related UI again, based on whether the user recognizes the obstacle within the initialized danger recognition time.

The processor 460 may track the gaze of the user using the camera 410 to determine whether the user recognizes the obstacle. For example, when it is recognized that the gaze of the user faces the obstacle through the camera 410, the processor 460 may determine that the user recognize the obstacle.

When the obstacle is recognized, the processor 460 may determine a danger recognition area for the recognized obstacle. For example, the danger recognition area may be a virtual area including a specified ratio or more of the obstacle. The processor 460 may recognize and track a gaze position of the user using the camera 410. When the gaze position of the user is included in the danger recognition area, the processor 460 may determine that the user recognize the obstacle. When the gaze position of the user remains during a specified time or more within the danger recognition area, the processor 460 may determine that the user recognize the obstacle.

The processor 460 may assign the danger recognition time set according to the UI level to the recognized obstacle. When the gaze position of the user is included in the danger recognition area within the danger recognition time, the processor 460 may suspend displaying the obstacle-related UI and may reassign the danger recognition time. The reassigned danger recognition time may be the same as or different from the previously assigned danger recognition time. For example, the reassigned danger recognition time may increase by twice the previously assigned danger recognition time.

The electronic device 401 may further include another component other than the configurations shown in FIG. 4. For example, the electronic device 401 may further include a communication circuit operatively connected with other components. The processor 460 or the electronic device 401 may receive information associated with danger of the user who wears the electronic device 401 from an external device through the communication circuit. For example, the electronic device 401 or the sensor 440 may further include a global positioning system (GPS) sensor. The electronic device 401 may transmit GPS information of the electronic device 401 or the user, which is obtained through the GPS sensor, to an external server through the communication circuit. The electronic device 401 may receive danger-related information associated with a position corresponding to the GPS information from the external server through the communication circuit. The danger-related information may be information used to determine an environment level. For example, the danger-related information may include information about whether it is the inside or the outside or whether it is adjacent to a driveway.

For example, the electronic device 401 may directly receive information about a surrounding danger element (e.g., an obstacle) from a surrounding closed-circuit television (CCTV) or a vehicle through the communication circuit which supports vehicle to everything (V2X) communication. For another example, the electronic device 401 may transmit GPS information to the external server which collects obstacle-related information and may receive obstacle-related information corresponding to the GPS information from the external server. The obstacle-related information may be used for the electronic device 401 to recognize an obstacle.

The case in which the electronic device 401 runs the obstacle collision warning application is given as an example in the above-mentioned embodiment of the disclosure, but embodiments of the disclosure are not limited thereto. According to one or more embodiments of the disclosure, the obstacle collision warning application may be run in a remote device (e.g., a mobile phone, a server, or a cloud) which communicates with the electronic device 401. The electronic device 401 may transmit and receive an input and an output for the remote device and the obstacle collision warning application.

Hereinafter, a description will be given of a function supported by an obstacle collision warning application with reference to FIG. 5.

Figure 5:
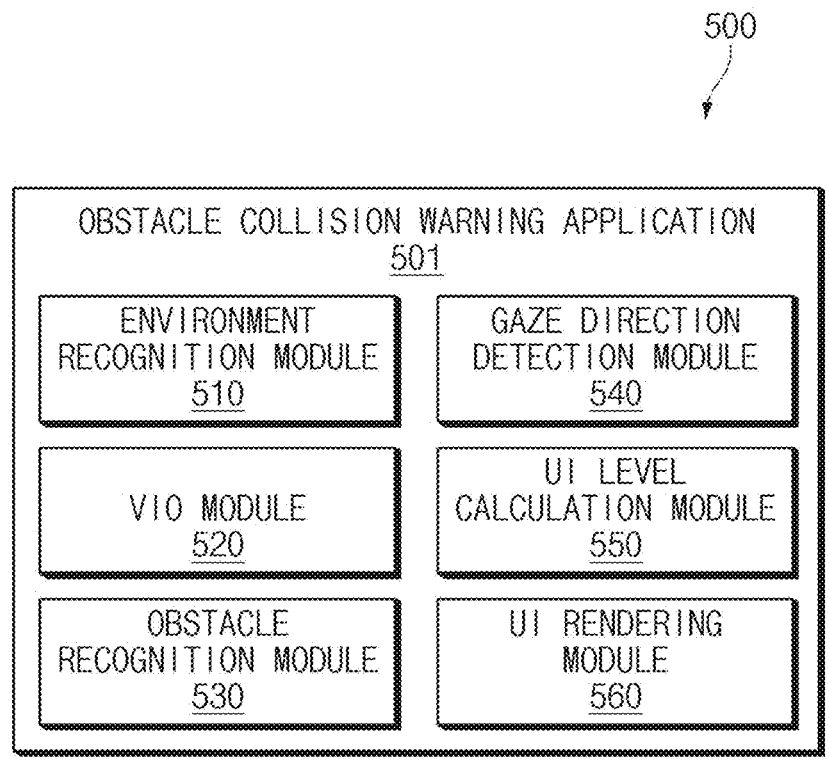
FIG. 5 is a block diagram of an obstacle collision warning application according to one or more embodiments of the disclosure.

FIG. 5 is a block diagram 500 of an obstacle collision warning application according to one or more embodiments of the disclosure.

Referring to FIG. 5, according to one or more embodiments of the disclosure, an obstacle collision warning application 501 may be executed in an electronic device 401 of FIG. 4. As a processor 460 executes instructions stored in the memory 450, the electronic device 401 may execute the obstacle collision warning application 501.

The obstacle collision warning application 501 may include, but is not limited to, an environment recognition module 510, a visual-inertial odometry (VIO) module 520, an obstacle recognition module 530, a gaze direction detection module 540, a UI level calculation module 550, and a UI rendering module 560. Each module of the obstacle collision warning application 501 may be a set of instructions for implementing a function supported by the obstacle collision warning application 501. Operations of each module, which will be described below, may be performed by a hardware component (e.g., the processor 460) of the electronic device 401 at least shown in FIG. 4.

The environment recognition module 510 may recognize a surrounding environment of the electronic device 401 or a user who wears the electronic device 401 and may determine an environment level. The environment recognition module 510 may recognize whether the electronic device 401 is used in a certain environment through a camera 410. For example, the environment recognition module 510 may recognize the inside, the outside, or a place where it is difficult to divide the inside and the outside. For the outside, the environment recognition module 510 may classify it as a park or vacant lot, a sidewalk, a sidewalk adjacent to a driveway, a street (e.g., an alley) in which the driveway and the sidewalk are not divided, a crosswalk, or a level crossing. However, this is merely illustrative, and various embodiments are not limited thereto. For example, various environments other than the above-mentioned environment may be recognized by the environment recognition module 510.

The environment recognition module 510 may obtain environmental information from an external device. For example, the environment recognition module 510 may transmit GPS information to an external server which collects information associated with danger of a user, may receive danger-related information associated with a position of the user, or may receive determination of whether the position of the user is the inside or the outside or is adjacent to the driveway. The environment recognition module 510 may further use the GPS information to more accurately recognize a surrounding environment.

The environment recognition module 510 may determine an environment level depending on the recognized environment. The environment recognition module 510 may determine an environment level depending on the currently recognized environment based on information about an environment level which is predefined according to the environment.

For example, the environment recognition module 510 may correct the environment level using a movement speed of the electronic device 401 or the user, which is obtained in the VIO module 520.

The VIO module 520 may recognize a posture and motion of the electronic device 401 or the user who wears the electronic device 401 using a camera 410 and the sensor 440. The VIO module 520 may obtain feature points from a plurality of images obtained through the camera 410 and may compare the feature points to calculate motion of the electronic device 401. The VIO module 520 may calculate motion of the electronic device 401 through an IMU sensor (e.g., an accelerometer sensor and/or an accelerometer sensor). The VIO module 520 may determine a posture and a position of the electronic device 401 on a three-dimensional space based on the calculated motion of the electronic device 401. The VIO module 520 may recognize whether the electronic device 401 or the user who wears the electronic device 401 faces any direction and how fast the user is moving at a certain speed in any direction, based on the posture and the position of the electronic device 401. The information recognized by the VIO module 520 may be used to calculate, for example, a UI level.

The VIO module 520 may not be included in the obstacle collision warning application 501 and may operate in a system level of the electronic device 401. In this case, only the result value of the VIO module 520 may be used in the obstacle collision warning application 501.

The VIO module 520 may use sensor information of another device used by the user of the electronic device 401. For example, the VIO module 520 may further use information of the IMU sensor included in a portable terminal or a smart watch except for a head mounted device.

The obstacle recognition module 530 may obtain information of a surrounding obstacle based on inputs through several sensors (e.g., the sensor 440, the camera 410, and/or the microphone 430) and may estimate an impulse capable of being applied to the user by each obstacle. The obstacle recognition module 530 may obtain obstacle information including a type, a direction, a distance, or a speed of the obstacle from an image input through the camera 410. The obstacle recognition module 530 may more accurately recognize a direction and a distance of the obstacle through the microphone 430 or a depth recognition camera.

The obstacle recognition module 530 may estimate an impulse capable of being applied to the user by the obstacle based on the movement speed of the electronic device 401 or the user, which is obtained in the VIO module 520. For example, the obstacle recognition module 530 may calculate a movement speed of the obstacle in the direction of the user based on the movement speed of the electronic device 401 or the user and may estimate an impulse of the obstacle for the user based on the movement speed of the obstacle in the direction of the user. The obstacle recognition module 530 may estimate a time when the user is able to respond to the obstacle based on the direction the electronic device 401 or the user faces. For example, the obstacle recognition module 530 may estimate a time when the user is able to respond to the obstacle based on a degree to which the direction the electronic device 401 or the user faces and the direction of the obstacle are identical to each other. The higher the identical degree, the shorter the response time may be.

The obstacle recognition module 530 may obtain obstacle information from an external device. For example, the obstacle recognition module 530 may directly receive information a surrounding danger element from a CCTV around the electronic device 401 or the user or a passing vehicle or may receive obstacle-related information corresponding to GPS information through an external server which collects information associated with the obstacle.

The gaze direction detection module 540 may detect a gaze direction of the user. For example, the gaze direction detection module 540 may detect a gaze direction of the user through the camera 410. The detected gaze direction of the user may be used to calculate a UI level.

The UI level calculation module 550 may calculate a UI level based on the environment level and the estimated impulse. The UI level calculation module 550 may synthesize the environment level obtained in the environment recognition module 510 and the obstacle recognition information obtained in the obstacle recognition module 530 to calculate a UI level, depending on a UI level determination method according to a predefined environment level and predefined obstacle recognition information. The obstacle recognition information may include obstacle information and/or an estimated impulse.

The UI level calculation module 550 may calculate a UI level in real time. For example, the UI level calculated in real time may be referred to as a default UI level. A level in which the default UI level is delayed and reflected may be referred to as a delayed UI level. When the default UI level is maintained during a specified time or more, the UI level calculation module 550 may update the delayed UI level to the maintained default UI level. For example, when the default UI level changes in an order of 2, 3, 2, and 3 and when it is immediately reflected, there is a probability that the user will see an unnecessary danger indication. When the time when the default UI level is maintained as 2 continues during the specified time or more, the UI level calculation module 550 may update the delayed UI level to 2. The specified time may be differentially applied according to the default UI level.

The UI level calculation module 550 may assign a danger recognition time according to the UI level and may give a margin in which the user is able to recognize danger. The UI level calculation module 550 may delay displaying a UI during the danger recognition time. The UI level calculation module 550 may identify whether the user recognize danger during the danger recognition time. Whether the user recognize the danger may be identified through the VIO module 520 or the gaze direction detection module 540. The UI level calculation module 550 may identify whether the gaze direction of the user, which is identified through the VIO module 520 or the gaze direction detection module 540, faces the obstacle within the danger recognition time.

The UI rendering module 560 may generate a graphic entity such that the user intuitively detects the obstacle based on the obstacle information or the UI level and may determine a graphic display level based on the UI level. The UI rendering module 560 may display a graphic entity for informing the user of a direction and a danger degree of the obstacle on a display based on the UI level calculated in the UI rendering module 550. The UI rendering module 560 may control the UI displayed on the display. For example, when it is determined that it is very dangerous because the obstacle quickly approaches the user (i.e., when the UI level is high), the UI rendering module 560 may deactivate an entity of another UI or may allow the entity of the other UI to disappear and may display a graphic entity of an obstacle-related UI. The UI rendering module 560 may determine a method for displaying an obstacle-related UI or a graphic entity depending on a UI display policy according to a predefined UI level. The UI rendering module 560 may differently generate a graphic entity depending on a direction, a distance, a speed, and a type of the obstacle. For example, the UI rendering module 560 may differently generate a size, the number, a shape, a color, or transparency of the graphic entity depending on the direction, the distance, the speed, and the type of the obstacle.

Hereinafter, a description will be given of an operation of an electronic device 401 with reference to FIG. 6.

Figure 6:
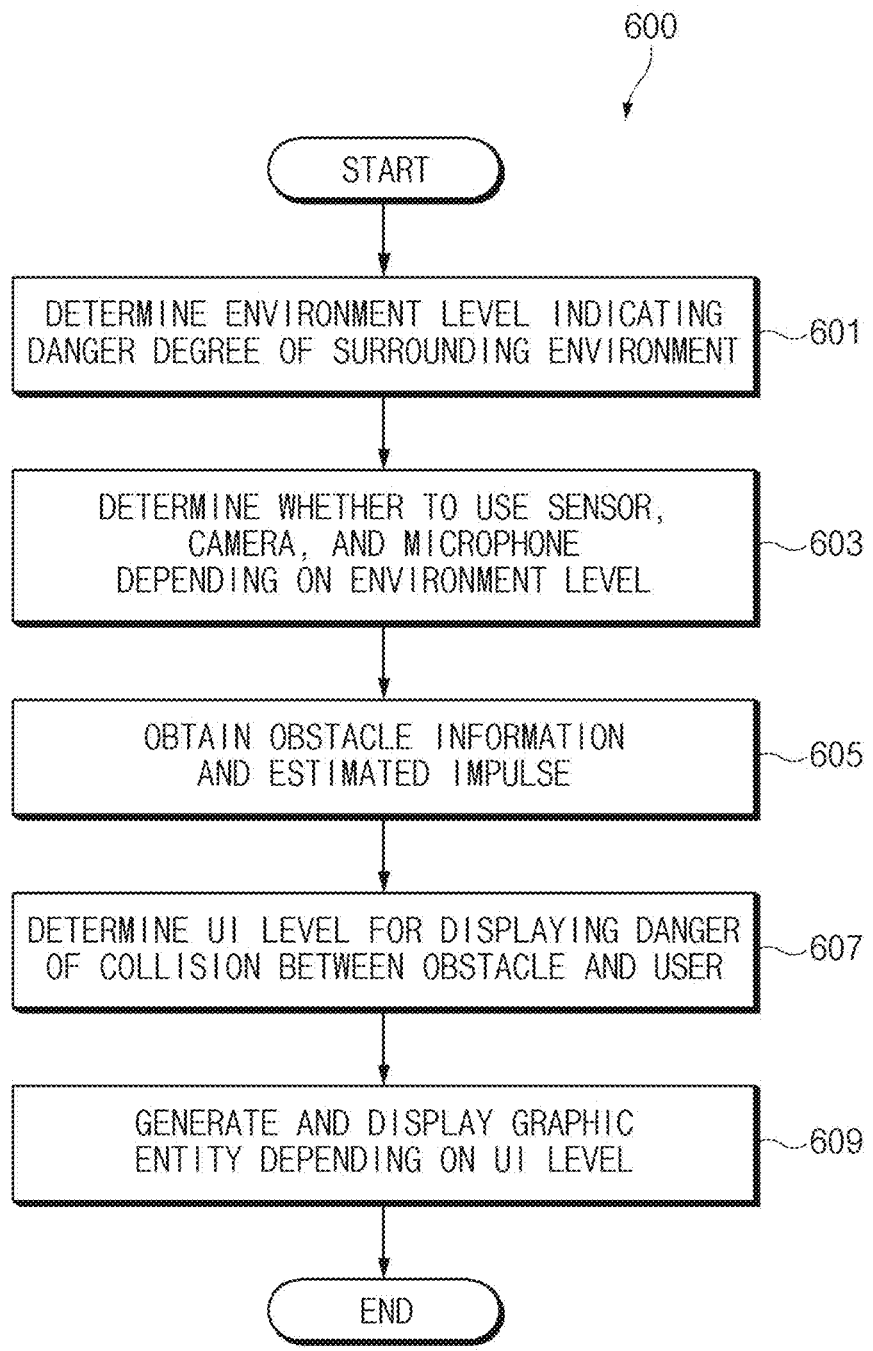
FIG. 6 is a flowchart illustrating an operation of an electronic device according to one or more embodiments of the disclosure.

FIG. 6 is a flowchart 600 illustrating an operation of an electronic device according to one or more embodiments of the disclosure.

Referring to FIG. 6, in operation 601, the electronic device 401 may determine an environment level indicating a danger degree of a surrounding environment. The electronic device 401 may determine the environment level indicating the danger degree of the surrounding environment for a user of the electronic device 401 based on an image obtained through a camera 410. As the environment level is higher, there may be an environment in which the danger degree of the user is higher.

The electronic device 401 may classify the image based on at least one of whether it is the inside or the outside, analysis of a vehicle-related element, or obstacle complexity. The electronic device 401 may determine an environment level depending on the classified result. The electronic device 401 may determine an environment level of a surrounding environment identified from the image obtained through the camera 410, based on information about an environment level which is predefined according to the surrounding environment. Operation 601 will be described below with reference to FIG. 7.

In operation 603, the electronic device 401 may determine whether to use the sensor 440, the camera 410, and a microphone 430 depending on the environment level. The electronic device 401 may determine a sensor to be used to recognize an obstacle depending on the environment level. Herein, the sensor may include an IMU sensor, a vision camera, a depth camera, and/or a microphone. As the environment level is higher, the electronic device 401 may determine to use more types of sensors. As the environment level is higher, the electronic device 401 may determine to use a sensor capable of obtaining more accurate obstacle information. The electronic device 401 may determine a sensor to be used to recognize an obstacle based on information about whether to use a sensor for each sensor, which is predefined according to the environment level. Operation 603 will be described below with reference to FIG. 8.

In operation 605, the electronic device 401 may obtain obstacle information and an estimated impulse. The electronic device 401 may obtain obstacle information and an estimated impulse between the obstacle and the user based on data input through the at least one determined to be used among the sensor 440, the camera 410, or the microphone 430.

The electronic device 401 may obtain obstacle information based on data input through the at least one of the sensor 440, the camera 410, or the microphone 430. The obstacle information may include, for example, a type of an obstacle, a direction of the obstacle, a distance to the obstacle, and/or a speed of the obstacle in the direction of the user.

The electronic device 401 may obtain an estimated impulse between the obstacle and the user based on the obstacle information. The estimated impulse may be a relative value for predicting whether the obstacle may have some impulses on the user when the obstacle and the user collides with each other. For example, the estimated impulse may be proportional to a speed of the obstacle in the direction of the user and a predicted weight of the obstacle. Operation 605 will be described below with reference to FIG. 9.

In operation 607, the electronic device 401 may determine a UI level for displaying danger of collision between the obstacle and the user. As the danger of collision between the obstacle and the user is higher, a higher UI level may be determined. The electronic device 401 may determine the UI level for displaying the danger of collision between the obstacle and the user based on the environment level, the obstacle information, and the estimated impulse. A display policy of an obstacle-related UI according to the UI level may be predefined to be stored in the electronic device 401. For example, at least one of whether it is possible to set whether to display the obstacle-related UI based on a user input or a relationship between the obstacle-related UI and another UI varies with the UI level, but not limited thereto. A method for differently displaying the obstacle-related UI depending on the UI level will be described below with reference to FIG. 10.

The electronic device 401 may determine a minimum level and a maximum level of the UI level depending on the environment level. The electronic device 401 may determine a range of the UI level corresponding to the environment level determined based on information about a minimum UI level and a maximum UI level which are predefined according to the environment level. As the environment level is higher, the minimum level and the maximum level of the UI level may become higher. The electronic device 401 may determine a UI level within a range by the minimum level and the maximum level based on the obstacle information and the estimated impulse. As the danger degree of the user, which is determined based on the obstacle information and the estimated impulse, is higher (e.g., as the estimated impulse is higher), the electronic device 401 may determine the UI level as being higher. Operation 607 will be described below with reference to FIG. 11.

In operation 609, the electronic device 401 may generate and display a graphic entity depending on the UI level. The electronic device 401 may generate a graphic entity indicating a direction and a danger degree of the obstacle depending on the UI level. The electronic device 401 may display an obstacle-related UI including the graphic entity on the display 420. The electronic device 401 may display the graphic entity based on the obstacle information. A description will be given below of the method for displaying the graphic entity based on the UI level and the obstacle information with reference to FIGS. 12, 15, and 16.

Hereinafter, a description will be given of an operation of determining an environment level in an electronic device 401 with reference to FIG. 7.

FIG. 7 is a drawing 700 illustrating an environment level determination operation of an electronic device according to one or more embodiments of the disclosure. Operations of the electronic device 401, which will be described below, may correspond to operation 601 of FIG. 6.

Referring to FIG. 7, the electronic device 401 may store information predefining an environment level according to a surrounding environment capable of being recognized through image classification. FIG. 7 is an example of information predefined for an environment level according to a surrounding environment. For example, the environment level may be determined based on at least one of whether it is the inside or the outside, analysis of a vehicle-related element, or obstacle complexity.

The electronic device 401 may perform image classification for an image obtained through a camera 410 to determine whether it is the indoor or the outside. Referring to FIG. 7, when the surrounding environment is determined as the inside from the image, the electronic device 401 may determine the environment level as "0". For example, when the surrounding environment is determined as the inside, the electronic device 401 may fail to perform image classification by analysis of a vehicle-related element and obstacle complexity, but not limited thereto.

When the surrounding environment is determined as the outside, the electronic device 401 may perform image classification by the analysis of the vehicle-related element for the image obtained through the camera 410. For example, the electronic device 401 may perform the image classification by the analysis of the vehicle-related element and may determine whether the surrounding environment is a sidewalk not adjacent to a driveway, a sidewalk adjacent to the driveway, or the driveway, a crossing, or a crosswalk. Referring to FIG. 7, when the surrounding environment is determined as the sidewalk not adjacent to the driveway, the electronic device 401 may perform the image classification by the obstacle complexity for the image obtained through the camera 410.

When the surrounding environment is determined as the sidewalk adjacent to the driveway or the driveway, the crossing, or the crosswalk, the electronic device 401 may determine that the surrounding environment is a high-risk environment regardless of the obstacle complexity. When the surrounding environment is determined as the sidewalk adjacent to the driveway or the driveway, the crossing, or the crosswalk, the electronic device 401 may fail to perform the image classification by the obstacle complexity for the image obtained through the camera 410, but not limited thereto.

The electronic device 401 may perform the image classification by the obstacle complexity for the image obtained through the camera 410. The obstacle complexity may be determined based on a situation in which a progress path of the user is disturbed or the speed of the user is reduced. The obstacle complexity may include at least one of, for example, the number of obstacles, whether the obstacles move, or distribution of the obstacles.

Referring to FIG. 7, for example, the electronic device 401 may perform the image classification by the obstacle complexity and may determine whether the surrounding environment has few or many obstacles. The electronic device 401 may determine that there are many obstacles, when the number of the obstacles is greater than or equal to a specified number, and may determine that there are few obstacles, when the number of the obstacles is less than the specified number.

The electronic device 401 may determine an environment level of an environment with many obstacles as being higher than an environment level of an environment with few obstacles. Referring to FIG. 7, when the surrounding environment is the outside and is the sidewalk adjacent to the driveway and there are the few obstacles, the electronic device 401 may determine the environment level as "1". When the surrounding environment is the outside and is the sidewalk not adjacent to the driveway and there are the many obstacles, the electronic device 401 may determine the environment level as "2".

As the danger of collision with the vehicle is higher, the electronic device 401 may determine the environment level as being higher. The danger of collision with the vehicle may be higher in the sidewalk adjacent to the driveway or the driveway, the crossing, or the crosswalk than the sidewalk not adjacent to the driveway. The danger of collision with the vehicle may be higher in the driveway, the crossing, or the crosswalk than the sidewalk adjacent to the driveway. Referring to FIG. 7, when the surrounding environment is the outside and is the sidewalk adjacent to the driveway, the electronic device 401 may determine the environment level as "3". When the surrounding environment is the outside and is the driveway, the crossing, or the crosswalk, the electronic device 401 may determine the environment level as "4".

The determination of the environment level according to the surrounding environment recognized through image classification in the electronic device 401 is not limited to the example shown in FIG. 7. The electronic device 401 may differently determine the environment level for the items shown in FIG. 7 (division of the inside and the outside, division by analysis of a vehicle-related element, and division by obstacle complexity) or may additionally consider an item other than the shown items to determine the environment level.

The electronic device 401 may correct the environment level depending on a motion speed of the user. The electronic device 401 may correct the environment level determined according to the surrounding environment recognized through the image classification depending on the motion speed of the user. An estimated impulse capable of being applied to the user by the obstacle may be relatively higher and the necessity that the electronic device 401 informs the user of danger may be higher, when the user moves at a specified speed or more than when the user does not move or moves at less than the specified speed. For example, when the user moves at the specified speed or more, the electronic device 401 may increase the environment level determined by the image classification by one stage. In FIG. 7, a maximum environment level may be 5.

Hereinafter, a description will be given of an operation of determining whether to use a sensor for each sensor in an electronic device 401 with reference to FIG. 8.

FIG. 8 is a drawing 800 illustrating an operation of determining whether to use a sensor for each sensor in an electronic device according to one or more embodiments of the disclosure. Operations of the electronic device 401, which will be described below, may correspond to operation 603 of FIG. 6.

Referring to FIG. 8, the electronic device 401 may store information predefining whether to use a sensor for each sensor depending on an environment level. FIG. 8 is an example of information predefined for whether to use a sensor for each sensor depending on a surrounding environment. Referring to FIG. 8, the sensor may include an IMU sensor, a vision camera, a depth camera, and a microphone. The IMU sensor of FIG. 8 may correspond to the sensor 440 of FIG. 4. The vision camera and the depth camera of FIG. 8 may correspond to a camera 410 of FIG. 4. The microphone of FIG. 8 may correspond to a microphone 430 of FIG. 4.

The electronic device 401 may determine whether to use a sensor for each sensor depending on the environment level. For example, the higher the environment level, the more the type of the used sensor may increase. Referring to FIG. 8, when the environment level is "0", the electronic device 401 may determine not to use all the IMU sensor, the vision camera, the depth camera, and the microphone. When the environment level is "1" or "2", the electronic device 401 may determine to use the IMU sensor and the vision camera and may determine not to use the depth camera and the microphone. When the environment level is "3" or "4", the electronic device 401 may determine to use the IMU sensor, the vision camera, and the depth camera and may determine not to use the microphone. The depth camera may be used to more accurately recognize a distance from an obstacle. When the environment level is "5", the electronic device 401 may determine to use all the IMU sensor, the vision camera, the depth camera, and the microphone. The electronic device 401 may predict a distance of the obstacle using a disparity of a sound input to each of a plurality of microphones mounted on the electronic device 401. The microphone may be used to detect danger of a range which is not recognized by a user and a camera.

The determination of whether to use the sensor for each sensor depending on the environment level in the electronic device 401 is not limited to the example shown in FIG. 8. For example, when the environment level is greater than or equal to a specified level, the electronic device 401 may determine not to use a specific sensor. For the depth camera, the higher the resolution, the more the power consumption may increase. As the resolution of the depth camera is higher, the electronic device 401 may more accurately predict a distance to the obstacle. When the environment level is greater than or equal to the specified level, the electronic device 401 may determine not to use some sensors except for the depth camera. The electronic device 401 may obtain high-resolution depth information through the depth camera using power reduced in the sensors which are not used.

Hereinafter, a description will be given of an operation of obtaining obstacle information and an estimated impulse in an electronic device 401 with reference to FIG. 9.

Figure 9:
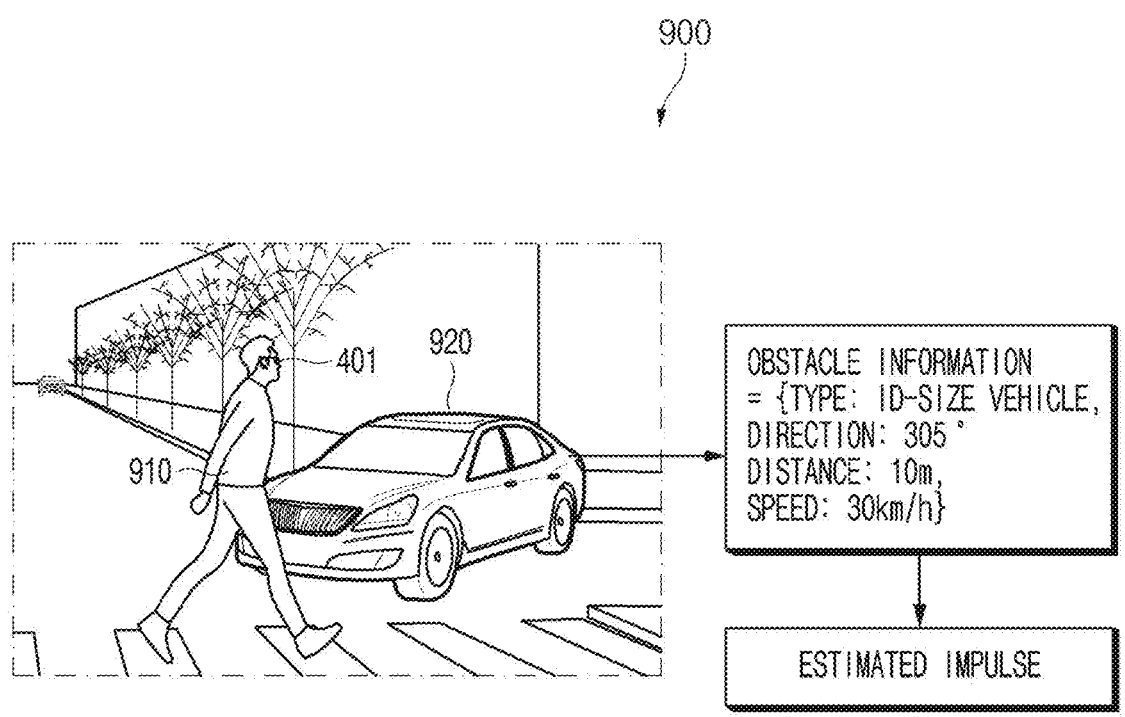
FIG. 9 is a drawing illustrating an operation of obtaining obstacle information and an estimated impulse in an electronic device according to one or more embodiments of the disclosure.

FIG. 9 is a drawing 900 illustrating an operation of obtaining obstacle information and an estimated impulse in an electronic device according to one or more embodiments of the disclosure. Operations of the electronic device 401, which will be described below, may correspond to operation 605 of FIG. 6.

Referring to FIG. 9, the electronic device 401 may obtain obstacle information including a type of an obstacle 920, a direction of the obstacle 920, a distance to the obstacle 920, and a speed of the obstacle 920 in the direction of a user. The electronic device 401 may perform object recognition for an image obtained through a camera 410 to obtain the type and a position of the obstacle 920. The electronic device 401 may perform distance recognition for the image obtained through the camera 410 to obtain the distance to the obstacle 920. The electronic device 401 may obtain a posture and a speed of the electronic device 401 or the user through the camera 410 and the sensor 440 and may calculate the direction of the obstacle 920 and the speed of the obstacle 920 in the direction of the user.

Referring to FIG. 9, for example, the electronic device 401 may obtain information that the type of the obstacle 920 is a "mid-size vehicle". The electronic device 401 may obtain information that the direction of the obstacle 920 is 305 degrees (305°) when the direction the user 910 faces is 0 degrees (0°). The electronic device 401 may obtain information that the distance from the electronic device 401 or the user 910 to the obstacle 920 is 10 m. The electronic device 401 may obtain information that the speed of the obstacle 920 in the direction of the user 910 is 30 km/h. The electronic device 401 may obtain the speed of the obstacle 920 in the direction of the user 910 based on a speed of the obstacle 920 and a speed of the user 910.

The electronic device 401 may calculate an estimated impulse based on the obtained obstacle information. The estimated impulse may be a value obtained by digitizing an influence of the object on the user. For example, the electronic device 401 may expect that an impulse of a dangerous type of obstacle (e.g., a vehicle) will be large. For another example, the electronic device 401 may expect that an impulse of an obstacle which progresses in the direction of being away from the user will be low.

The estimated impulse may be represented as various numerical numbers. For example, the estimated impulse may be represented as a standard unit, such as kg-m/s, or may be criticality for the user and may be represented as a value between 0 and 100.

For example, the electronic device 401 may store information for previously setting a coefficient associated with a weight depending on the type of the obstacle. The electronic device 401 may calculate an estimated impulse based on the coefficient corresponding to the type of the recognized obstacle. For example, the electronic device 401 may multiply the speed of the obstacle 920, "30 km/h", by a weight-related coefficient corresponding to the type of the obstacle 920, "mid-size vehicle".

Hereinafter, a description will be given of a UI display policy of an electronic device 401 according to a UI level with reference to FIG. 10.

FIG. 10 is a drawing 1000 illustrating a UI display policy of an electronic device according to a UI level according to one or more embodiments of the disclosure.

Referring to FIG. 10, the electronic device 401 may store a UI display policy according to a UI level. For example, the UI level may be defined as, but not limited to, 5 stages of "Low", "Information", "Caution", "Warning", and "Danger". As the UI level is higher, danger of a higher level may be indicated.

For example, at least one of whether it is possible to set whether to display an obstacle-related UI based on a user input or a relationship between the obstacle-related UI and another UI may vary with the UI level.

For example, when it is determined as a first UI level, it may be possible to set whether to display the obstacle-related UI based on the user input. When it is determined as a second UI level higher than the first UI level, it may be impossible to set whether to display the obstacle-related UI based on the user input. Referring to FIG. 10, when the UI level is "Information", it may be possible for the electronic device 401 to set whether to display the obstacle-related UI based on the user input. The electronic device 401 may determine whether to display the obstacle-related UI based on the user input regardless of the UI level. When the UI level is "Caution", "Warning", or "Danger" higher than "Information", it may be impossible for the electronic device 401 to set whether to display the obstacle-related UI based on the user input. The electronic device 401 may determine whether to display the obstacle-related UI based on the UI level regardless of the user input.

For another example, even when it is determined as the second UI level higher than the first UI level, it may be possible for the electronic device 401 to set whether to display the obstacle-related UI based on the user input. When it is determined as the first UI level, the electronic device 401 may set not to display the obstacle-related UI in response to a user input not to display the obstacle-related UI. When it is determined as the second UI level, the electronic device 401 may request acknowledgement from the user in response to the user input not to display the obstacle-related UI or may output a notification of recommending displaying the obstacle-related UI on its display. The electronic device 401 may set whether to display the obstacle-related UI based on a response to the request. After outputting the notification of recommending displaying the obstacle-related UI, the electronic device 401 may set to display the obstacle-related UI in response to receiving the user input to display the obstacle-related UI.

For example, when it is determined as the first UI level, the electronic device 401 may determine to only another UI and not to display the obstacle-related UI. When it is determined as the second UI level higher than the first UI level, the electronic device 401 may determine to display the obstacle-related UI behind (or below) another UI. When it is determined as a third UI level higher than the second UI level, the electronic device 401 may determine to display the obstacle-related UI in front of (or above) the other UI. When it is determined as a fourth UI level higher than the third UI level, the electronic device 401 may determine to only the obstacle-related UI and not to display the other UI.

Referring to FIG. 10, when the UI level is "Low", the electronic device 401 may determine not to display the obstacle-related UI. For example, when there is a low probability that danger will occur to the user due to the obstacle, displaying the obstacle-related UI in the electronic device 401 may be providing unnecessary information. When the UI level is "Information" or "Caution" higher than "Low", the electronic device 401 may determine to display the obstacle-related UI, which may determine to display the obstacle-related UI behind another UI. The obstacle-related UI may be covered by the other UI in the "Information" or "Caution" level. When the UI level is "Warning" higher than "Information" or "Caution", the electronic device 401 may determine to display the obstacle-related UI in front of the other UI. The other UI may be covered by the obstacle-related UI in the "Warning" level. When it is "Danger" higher than "Warning", the electronic device 401 may determine to display only the obstacle-related UI and not to display the other UI. The electronic device 401 may hide the displaying of the other UI except for the obstacle-related UI in the "Danger" level.

The display policy of the obstacle-related UI of the electronic device 401 according to the UI level is not limited to the example shown in FIG. 10. For example, transparency of a UI may be differentially applied according to the UI level. Another value between 0 and 100 may be applied to transparency of the obstacle-related UI in the "Information" level and the "Caution" level, which is capable of being covered by the other UI in FIG. 10. For example, the transparency of the obstacle-related UI in the "Caution" level may be lower than the transparency of the obstacle-related UI in the "Information" level.

Hereinafter, a description will be given of a UI level determination operation of an electronic device 401 with reference to FIG. 11.

FIG. 11 is a drawing 1100 illustrating a UI level determination operation of an electronic device according to one or more embodiments of the disclosure. Operations of the electronic device 401, which will be described below, may correspond to operation 607 of FIG. 6.

Referring to FIG. 11, the electronic device 401 may store information predefining a minimum UI level and a maximum UI level according to an environment level. FIG. 11 is an example of information predefined for a minimum level and a maximum level of a UI level according to an environment level. Referring to FIG. 11, when the environment level is "0", the electronic device 401 may determine the minimum UI level as "Low" and may determine the maximum UI level as "Low". When the environment level is "1", the electronic device 401 may determine the minimum UI level as "Low" and may determine the maximum UI level as "Information". When the environment level is "2", the electronic device 401 may determine the minimum UI level as "Information" and may determine the maximum UI level as "Warning". When the environment level is "3", the electronic device 401 may determine the minimum UI level as "Caution" and may determine the maximum UI level as "Danger". When the environment level is "4", the electronic device 401 may determine the minimum UI level as "Warning" and may determine the maximum UI level as "Danger". When the environment level is "5", the electronic device 401 may determine the minimum UI level as "Danger" and may determine the maximum UI level as "Danger".

The electronic device 401 may determine a UI level depending on obstacle information and an estimated impulse in a range by the minimum UI level and the maximum UI level determined according to the environment level. For example, as the estimated impulse is larger, the electronic device 401 may determine a larger UI level in the range. As the speed of the obstacle in the direction of a user is larger, the electronic device 401 may determine a larger UI level in the range. As the distance to the obstacle is closer, the electronic device 401 may determine a larger UI level in the range.

The electronic device 401 may correct information about the minimum UI level and the maximum UI level according to the environment level based on a user input. For example, the electronic device 401 may provide the information predefining the minimum UI level and the maximum UI level according to the environment level as a default value and may correct the minimum UI level or the maximum UI level based on the user input. The electronic device 401 may adjust the minimum level or the maximum level in response to a user input for adjusting the minimum level or the maximum level. For example, the electronic device 401 may determine the minimum UI level or the maximum UI level according to the environment level, which is corrected by the user input, as a specified threshold range.

When receiving a user input for correcting the minimum UI level or the maximum UI level to be out of the specified threshold range according to the environment level, the electronic device 401 may display a warning screen on its display and may guide the specified threshold range. When the minimum level or the maximum level adjusted by the user input is lower than the specified level, the electronic device 401 may guide the UI level recommended according to the environment level. For example, for environment level "4", the minimum UI level is "Caution" and the maximum UI level may be "Warning" in the specified threshold range. When receiving a user input for correcting the minimum UI level to "Information" in environment level "4", the electronic device 401 may guide the minimum UI level to be set to "Caution".

Hereinafter, a description will be given of a method for displaying an obstacle-related UI depending on a UI level in an electronic device 401 with reference to FIG. 12.

Figure 12:
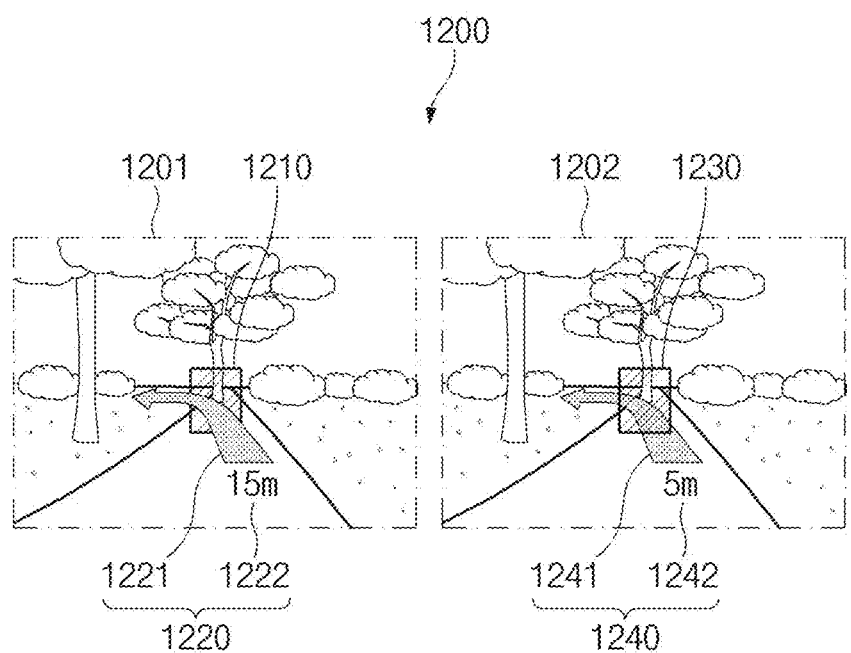
FIG. 12 is a drawing illustrating a method for displaying an obstacle-related UI depending on a UI level in an electronic device according to one or more embodiments of the disclosure.

FIG. 12 is a drawing 1200 illustrating a method for displaying an obstacle-related UI depending on a UI level in an electronic device according to one or more embodiments of the disclosure.

Referring to FIG. 12, a user may be walking on an environment which is the outside in a state in which he or she wears the electronic device 401, is a sidewalk not adjacent to a driveway, and has few obstacles. For example, the electronic device 401 may display obstacle-related UI based on information shown in FIGS. 7, 8, 10, and 11.

According to FIG. 7, the electronic device 401 may determine an environment level corresponding to the environment which is the outside, is the sidewalk not adjacent to the driveway, and has the few obstacles as "1". Because the user is currently walking and is moving at a specified speed or more, the electronic device 401 may correct the environment level to be high by one stage. The electronic device 401 may correct the environment level from "1" to "2".

According to FIG. 8, the electronic device 401 may determine to use an IMU sensor and a vision camera in response to environment level "2" and may determine not to use a depth camera and a microphone. The electronic device 401 may obtain obstacle information using the IMU sensor and the vision camera. The electronic device 401 may obtain an estimated impulse based on the obtained obstacle information.

According to FIG. 11, the electronic device 401 may determine the minimum UI level as "Information" and may determine the maximum UI level as "Warning", in response to environment level "2". The electronic device 401 may determine the UI level as one of "Information", "Caution", or "Warning". The electronic device 401 may determine the UI level as one of "Information", "Caution", or "Warning" based on the estimated impulse of the obstacle.

Referring to FIG. 12, the electronic device 401 may recognize a front tree placed in a progress direction of the user as an obstacle. A first screen 1201 may be a screen displayed on the display 420 of the electronic device 401 when the distance between the user and the obstacle is 15 m. A second screen 1202 may be a screen displayed on the display 420 of the electronic device 401 when the distance between the user and the obstacle is 5 m. The electronic device 401 may determine that the estimated impulse is lower when the distance to the obstacle is 15 m than when the distance to the obstacle is 5 m.

For example, when the distance to the obstacle is 15 m, the electronic device 401 may determine the UI level as "Information". According to FIG. 10, it is possible for the electronic device 401 to set whether to display the obstacle-related UI based on the user input in the "Information" level. When receiving a user input for setting not to display the obstacle-related UI, the electronic device 401 may fail to display an obstacle-related UI 1210.

When receiving a user input for setting to display the obstacle-related UI, the electronic device 401 may display the obstacle-related UI 1210. According to FIG. 10, the electronic device 401 may display the obstacle-related UI 1210 behind another UI 1220 in the "Information" level. Referring to the first screen 1201, the obstacle-related UI 1210 may be covered by the other UI 1220. For example, the obstacle-related UI 1210 may include a graphic entity indicating an area including the obstacle. For example, the other UI 1220 may be a UI of a navigation application, which may include a graphic entity 1221 indicating a direction and a graphic entity 1222 indicating a distance.

For example, as the user walks in the direction of the obstacle, the distance to the obstacle may be 5 m. For example, when the distance to the obstacle is 5 m, the electronic device 401 may determine the UI level as "Warning". According to FIG. 10, the electronic device 401 may display an obstacle-related UI 1230 in front of another UI 1240 in the "Warning" level. Referring to the second screen 1202, the other UI 1240 may be covered by the obstacle-related UI 1230. For example, the other UI 1240 may be a UI of the navigation application, which may include a graphic entity 1241 indicating a direction and a graphic entity 1242 indicating a distance.

Hereinafter, a description will be given of a viewing angle range in an obstacle collision warning application with reference to FIG. 13.

Figure 13:
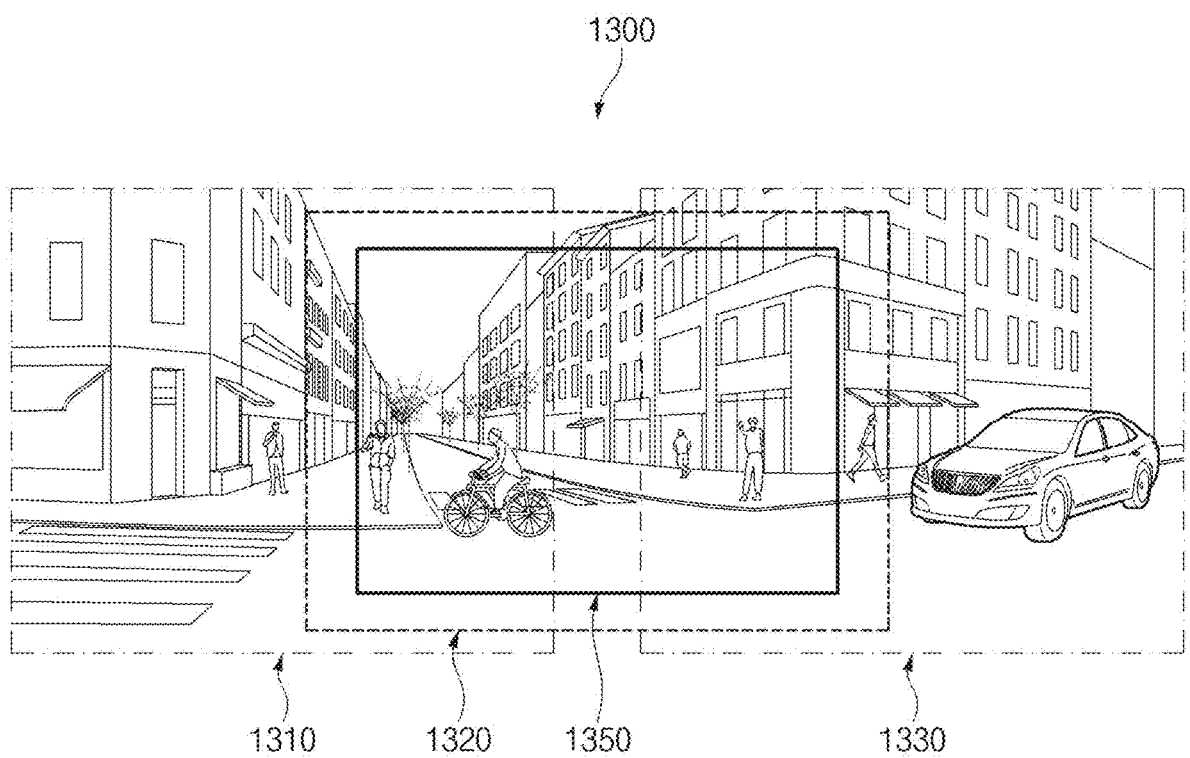
FIG. 13 is a drawing illustrating a viewing angle range in an obstacle collision warning application according to one or more embodiments of the disclosure.

FIG. 13 is a drawing 1300 illustrating a viewing angle range in an obstacle collision warning application according to one or more embodiments of the disclosure.

Referring to FIG. 13, an electronic device 401 which supports the obstacle collision warning application may include one or more cameras which cover a wider area than a human viewing angle. For example, the electronic device 401 may include 3 cameras facing the center, the left, and the right. Referring to FIG. 13, a first area 1310 may be an image capture area of a camera facing the left, a second area 1320 may be an image capture area of a camera facing the center, and a third area 1330 may be an image capture area of a camera facing the right.

The electronic device 401 may display at least some of the image capture areas 1310, 1320, and 1330 of the plurality of cameras on the display 420. A display area 1350 displayed on the display 420 of the electronic device 401 may be included in, for example, an image capture area of a specific camera. Referring to FIG. 13, the display area 1350 may be included in the image capture area 1320 of the camera facing the center.

A viewing angle range in the obstacle collision warning application of the disclosure may be defined as the display area 1350 or some of the image capture areas 1310, 1320, and 1330 of the cameras. For example, the obstacle out of the viewing angle range may fail to be included in the display area 1350 or only a portion of the obstacle may be included in the display area 1350. The obstacle out of the viewing angle range may be included or may fail to be included in the human viewing angle, but may be an obstacle which is difficult to be relatively more found by the user than an obstacle within the viewing angle range.

The electronic device 401 may vary methods for displaying the obstacle within the viewing angle range and the obstacle out of the viewing angle range. A description will be given below with reference to FIG. 14 in conjunction with it.

Hereinafter, a description will be given of the method for displaying the obstacle within the viewing angle range and the obstacle out of the viewing angle range depending on the UI level in the electronic device 401 with reference to FIG. 14.

FIG. 14 is a drawing 1400 illustrating a method for displaying an obstacle-related UI depending on a UI level in an electronic device according to one or more embodiments of the disclosure. FIG. 14 is an example of a UI display policy of an electronic device 401 according to a UI level.

The UI display policy shown in FIG. 14 may be stored in the electronic device 401 together with a UI display policy shown in FIG. 10. The UI display policy shown in FIG. 14 may be applied when displaying an obstacle-related UI of an obstacle collision warning application.

The electronic device 401 may divide the obstacle within the viewing angle range and the obstacle out of the viewing angle range and may determine a method for displaying an obstacle-related UI according to a UI level. The electronic device 401 may differently determine a UI display method for the same UI level depending on whether it is the obstacle within the viewing angle range or the obstacle out of the viewing angle range. The electronic device 401 may display an icon corresponding to the obstacle for the obstacle within the viewing angle range. The electronic device 401 may display an orientation of the obstacle for the obstacle out of the viewing angle range.

The electronic device 401 may differently display the obstacle-related UI depending on the UI level for the obstacle within the viewing angle range. When the UI level is less than a specified level, the electronic device 401 may determine not to display a UI for the obstacle within the viewing angle range. For example, when the UI level is "Low", the electronic device 401 may determine not to display the UI for the obstacle within the viewing angle range. As the UI level is higher, the electronic device 401 may determine a size of the icon corresponding to the obstacle as being larger and may determine transparency of the icon as being lower. For example, when the UI level is "Information" or "Caution" higher than "Low", the electronic device 401 may display the icon corresponding to the obstacle as a small icon and may set the transparency of the icon to be high. When the UI level is "Warning" or "Danger" higher than "Caution", the electronic device 401 may display the icon corresponding to the obstacle as a large icon and may set the transparency of the icon to be low. The small/large icon and the high/lower transparency, which are described above, may be a relative value. A first size of the small icon may be smaller than a second size of the large icon. First transparency of the high transparency may be higher than second transparency of the low transparency.

The electronic device 401 may differently display the obstacle-related UI depending on the UI level for the obstacle out of the viewing angle range. When the UI level is less than the specified level, the electronic device 401 may determine not to display a UI for the obstacle out of the viewing angle range. For example, when the UI level is "Low" or "Information", the electronic device 401 may determine not to display the UI for the obstacle out of the viewing angle range.

The electronic device 401 may differently determine a UI level for starting to display the obstacle-related UI depending on whether it is the obstacle within the viewing angle range or the obstacle out of the viewing angle range. Referring to FIG. 14, for example, the electronic device 401 may start to display the obstacle-related UI in the "Information" level for the obstacle within the viewing angle range and may start to display the obstacle-related UI in the "Caution" level for the obstacle out of the viewing angle range.

As the UI level is higher, the electronic device 401 may determine to more accurately display an orientation of the obstacle. For example, when the UI level is "Caution" or "Warning" for the obstacle out of the viewing angle range, the electronic device 401 may determine to display an approximate direction of the position of the obstacle. When the UI level is "Danger" higher than "Warning", the electronic device 401 may determine to accurately display an orientation of the obstacle. The orientation of the obstacle may be an orientation with respect to the user. For example, the electronic device 401 may display a direction of the obstacle as 4 front, rear, left, and right orientations, as an approximate direction indication. The electronic device 401 may display the direction of the obstacle as 8 orientations, 16 orientations, or 32 orientations more subdivided than 4 orientations, as an accurate orientation indication.

Hereinafter, a description will be given of a method for displaying a UI for an obstacle out of a viewing angle range with reference to FIGS. 15 and 16.

Figure 15:
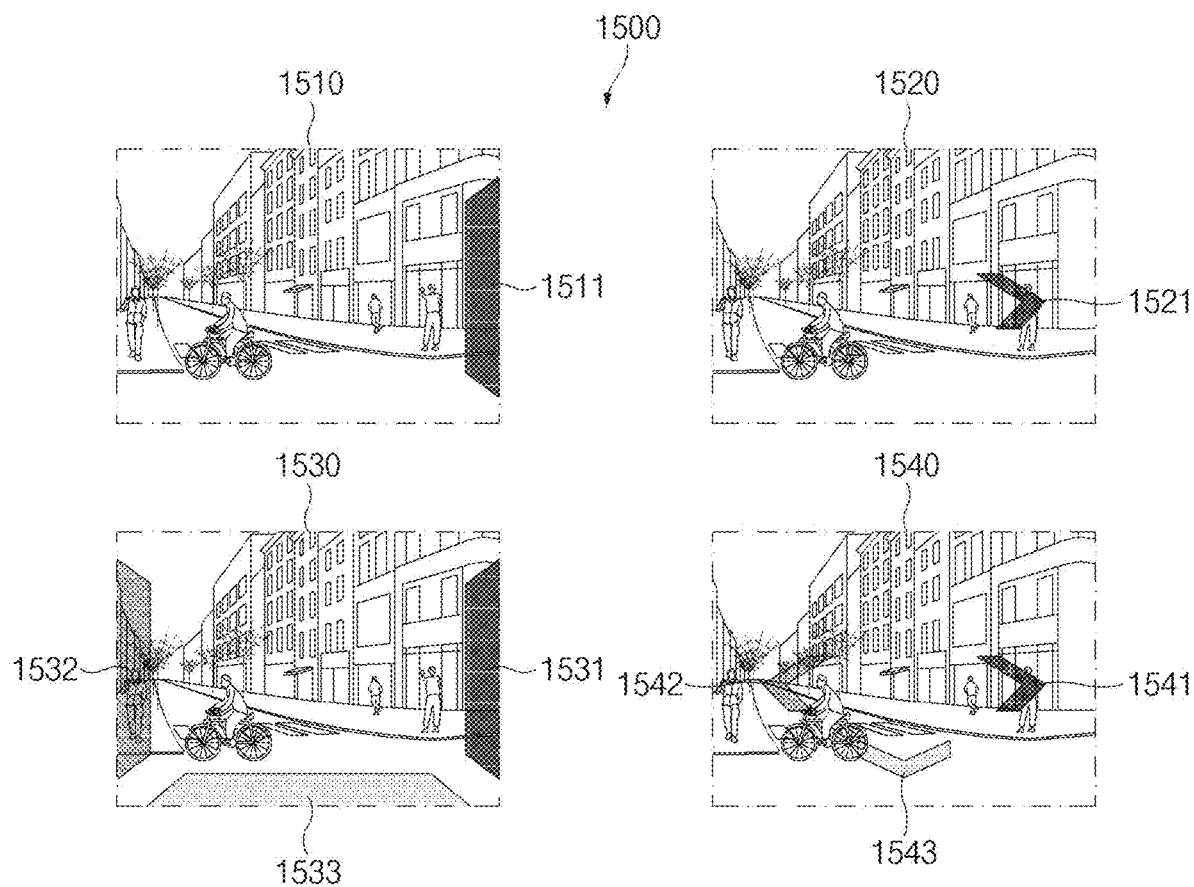
FIG. 15 is a drawing illustrating a UI for an obstacle out of a viewing angle range according to one or more embodiments of the disclosure.

FIG. 15 is a drawing 1500 illustrating a UI for an obstacle out of a viewing angle range according to one or more embodiments of the disclosure.

Referring to FIG. 15, an electronic device 401 may display a first screen 1510, a second screen 1520, a third screen 1530, or a fourth screen 1540 on the display 420, as a UI of an obstacle collision warning application.

The electronic device 401 may display an obstacle out of a viewing angle range to allow a user to recognize an approximate direction of a position of the obstacle depending on a UI level. Referring to FIG. 14, for example, the electronic device 401 may display the first screen 1510, the second screen 1520, the third screen 1530, or the fourth screen 1540 in a state in which the UI level is determined as "Caution" or "Warning".

Referring to FIG. 15, the electronic device 401 may display a UI indicating the position of the obstacle as 4 front, rear, left, and right orientations. Referring to the first screen 1510 and the third screen 1530, for example, the electronic device 401 may display graphic entities 1511, 1531, 1532, and 1533 along edges of the display 420 to display an orientation of the obstacle. Referring to the second screen 1520 and the fourth screen 1540, for another example, the electronic device 401 may display graphic entities 1521, 1541, 1542, and 1543 with an arrow form to display an orientation of the obstacle.

Referring to the first screen 1510 and the second screen 1520, the electronic device 401 may display a UI indicating danger by one obstacle. For example, the electronic device 401 may display a UI indicating only danger by one obstacle with the highest estimated impulse among the plurality of recognized obstacles. The first screen 1510 may include the graphic entity 1511 indicating the orientation of the obstacle with the highest estimated impulse among the plurality of recognized obstacles. The second screen 1520 may include the graphic entity 1521 indicating the orientation of the obstacle with the highest estimated impulse among the plurality of recognized obstacles.

Referring to the third screen 1530 and the fourth screen 1540, the electronic device 401 may display a UI simultaneously indicating danger by the plurality of obstacles. For example, the electronic device 401 may display a UI simultaneously indicating danger by the plurality of obstacles by applying transparency depending on estimated impulses of the plurality of recognized obstacles. As the estimated impulse is larger, the electronic device 401 may apply transparency to be lower. The third screen 1530 may include the graphic entities 1531, 1532, and 1533 indicating respective orientations of the plurality of recognized obstacles. The first graphic entity 1531 may have a larger estimated impulse than the second graphic entity 1532 and the second graphic entity 1532 may have a larger estimated impulse than the third graphic entity 1533. The first graphic entity 1531 may have lower transparency than the second graphic entity 1532 and the second graphic entity 1532 may have lower transparency than the third graphic entity 1533. The fourth screen 1540 may include the graphic entities 1541, 1542, and 1543 indicating respective orientations of the plurality of recognized obstacles. The first graphic entity 1541 may have a larger estimated impulse than the second graphic entity 1542 and the second graphic entity 1542 may have a larger estimated impulse than the third graphic entity 1543. The first graphic entity 1541 may have lower transparency than the second graphic entity 1542 and the second graphic entity 1542 may have lower transparency than the third graphic entity 1543.

Figure 16:
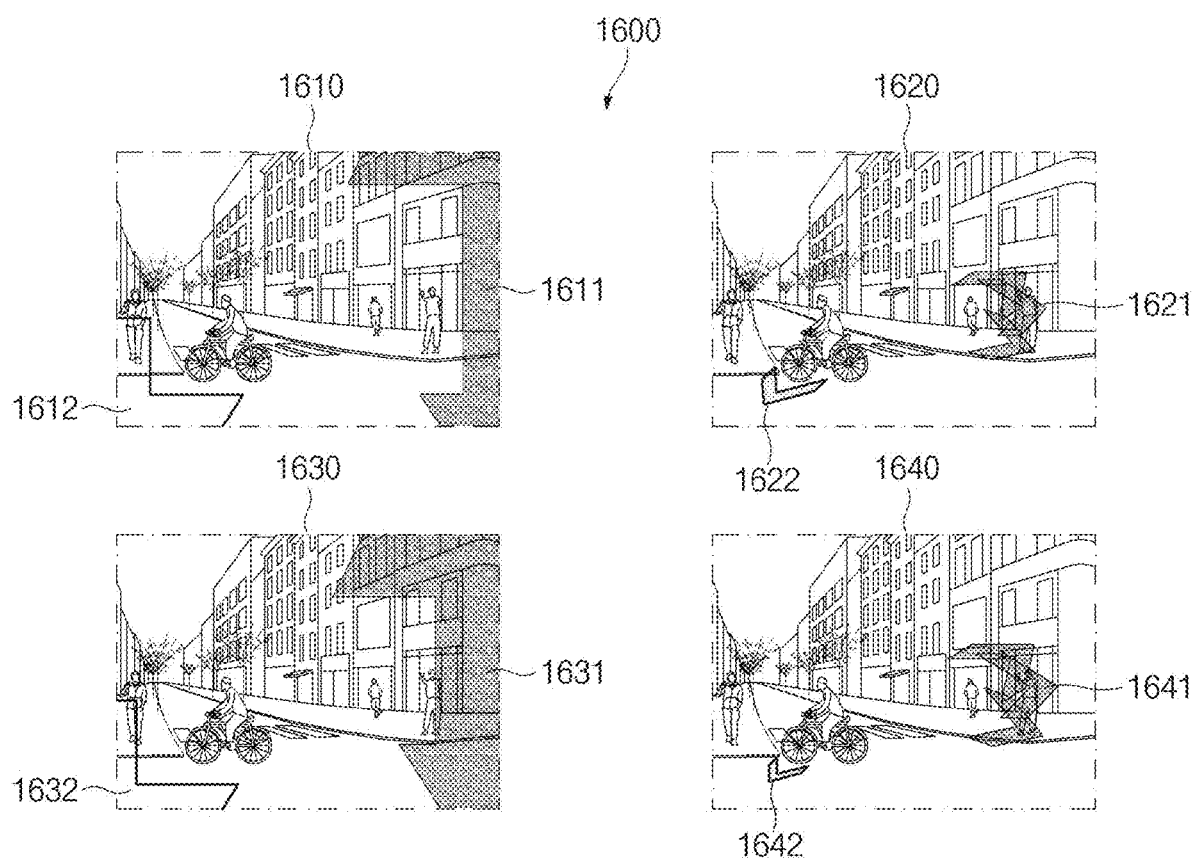
FIG. 16 is a drawing illustrating a UI for an obstacle out of a viewing angle range according to one or more embodiments of the disclosure.

FIG. 16 is a drawing 1600 illustrating a UI for an obstacle out of a viewing angle range according to one or more embodiments of the disclosure.

Referring to FIG. 16, an electronic device 401 may display a first screen 1610, a second screen 1620, a third screen 1630, or a fourth screen 1640 on the display 420, as a UI of an obstacle collision warning application.

The electronic device 401 may display an obstacle out of a viewing angle range to allow a user to recognize an accurate direction of a position of the obstacle depending on a UI level. Referring to FIG. 14, for example, the electronic device 401 may display the first screen 1610, the second screen 1620, the third screen 1630, or the fourth screen 1640 in a state in which the UI level is determined as "Danger".

Referring to FIG. 16, the electronic device 401 may display a UI indicating the position of the obstacle as orientations which are more subdivided than 4 front, rear, left, and right orientations. Referring to the first screen 1610 and the third screen 1630, for example, the electronic device 401 may display graphic entities 1611, 1612, 1631, and 1632 along edges of the display 420 to display an orientation of the obstacle. For example, the graphic entities 1611, 1612, 1631, and 1632 may indicate different orientations depending on how long they are displayed on any side. Referring to the second screen 1620 and the fourth screen 1640, for another example, the electronic device 401 may display graphic entities 1621, 1622, 1641, and 1642 with an arrow form to display an orientation of the obstacle. For example, the direction pointed by each of arrows of the graphic entities 1621, 1622, 1641, and 1642 may correspond to one value between 0° to 360°.

The electronic device 401 may differently display a color of the graphic entity corresponding to the obstacle depending on an estimated impulse of the obstacle. For example, as the estimated impulse is larger, the electronic device 401 may display a graphic entity in a color with higher visibility to the user. For example, a color corresponding to an estimated impulse range may be predetermined to be stored in the electronic device 401. The higher the speed of the obstacle in the direction of the user and the closer the distance between the obstacle and the user, the larger the estimated impulse may be.

Referring to FIG. 16, an estimated impulse of a first obstacle corresponding to the first graphic entities 1611, 1621, 1631, and 1641 may be larger than an estimated impulse of a second obstacle corresponding to the second graphic entities 1612, 1622, 1632, and 1642. The electronic device 401 may display the first graphic entities 1611, 1621, 1631, and 1641 in a more striking color than the second graphic entities 1612, 1622, 1632, and 1642.

The description is given of the above-mentioned example of the method for differently displaying the colors of the graphic entities corresponding to the obstacle depending on the estimated impulse of the obstacle in the electronic device 401, but not limited thereto. The electronic device 401 may differently display transparency of the graphic entities corresponding to the obstacle depending on the estimated impulse of the obstacle. For example, as the estimated impulse is larger, the electronic device 401 may display a graphic entity at lower transparency.

Referring to the third screen 1630 and the fourth screen 1640, the electronic device 401 may differently display a size of the graphic entity corresponding to each obstacle depending on the estimated impulse of the obstacle. For example, the estimated impulse of the first obstacle corresponding to the first graphic entities 1631 and 1641 may be larger than the estimated impulse of the second obstacle corresponding to the second graphic entities 1632 and 1642. The electronic device 401 may display the first graphic entities 1631 and 1641 to be larger than the second graphic entities 1632 and 1642. On the third screen 1630, the electronic device 401 may display a thickness of the first graphic entity 1631 to be thicker than a thickness of the second graphic entity 1632 to display the second graphic entity 1632 to be larger than the first graphic entity 1631.

Referring to the first screen 1610 and the third screen 1630, the electronic device 401 may differently display a direction range indicated by the graphic entity depending on the size of the obstacle. For example, the size of the first obstacle corresponding to the first graphic entities 1611 and 1631 may be larger than the size of the second obstacle corresponding to the second graphic entities 1612 and 1632. As the size of the obstacle is larger, the direction range corresponding to the obstacle may be wider. The electronic device 401 may display the direction range indicated by the first graphic entities 1611 and 1631 to be wider than the direction range indicated by the second graphic entities 1612 and 1632.

Referring to the second screen 1620 and the fourth screen 1640, the electronic device 401 may differently display the number of graphic entities depending on the size of the obstacle. For example, the size of the first obstacle corresponding to the first graphic entities 1621 and 1641 may be larger than the size of the second obstacle corresponding to the second graphic entities 1622 and 1642. The electronic device 401 may display the number of arrows included in the first graphic entities 1621 and 1641 to be greater than the number of arrows included in the second graphic entities 1622 and 1642. The electronic device 401 may display the first graphic entities 1621 and 1641 such that the plurality of arrows point one obstacle.

Hereinafter, a description will be given of an operation of an electronic device 401 with reference to FIG. 17.

Figure 17:
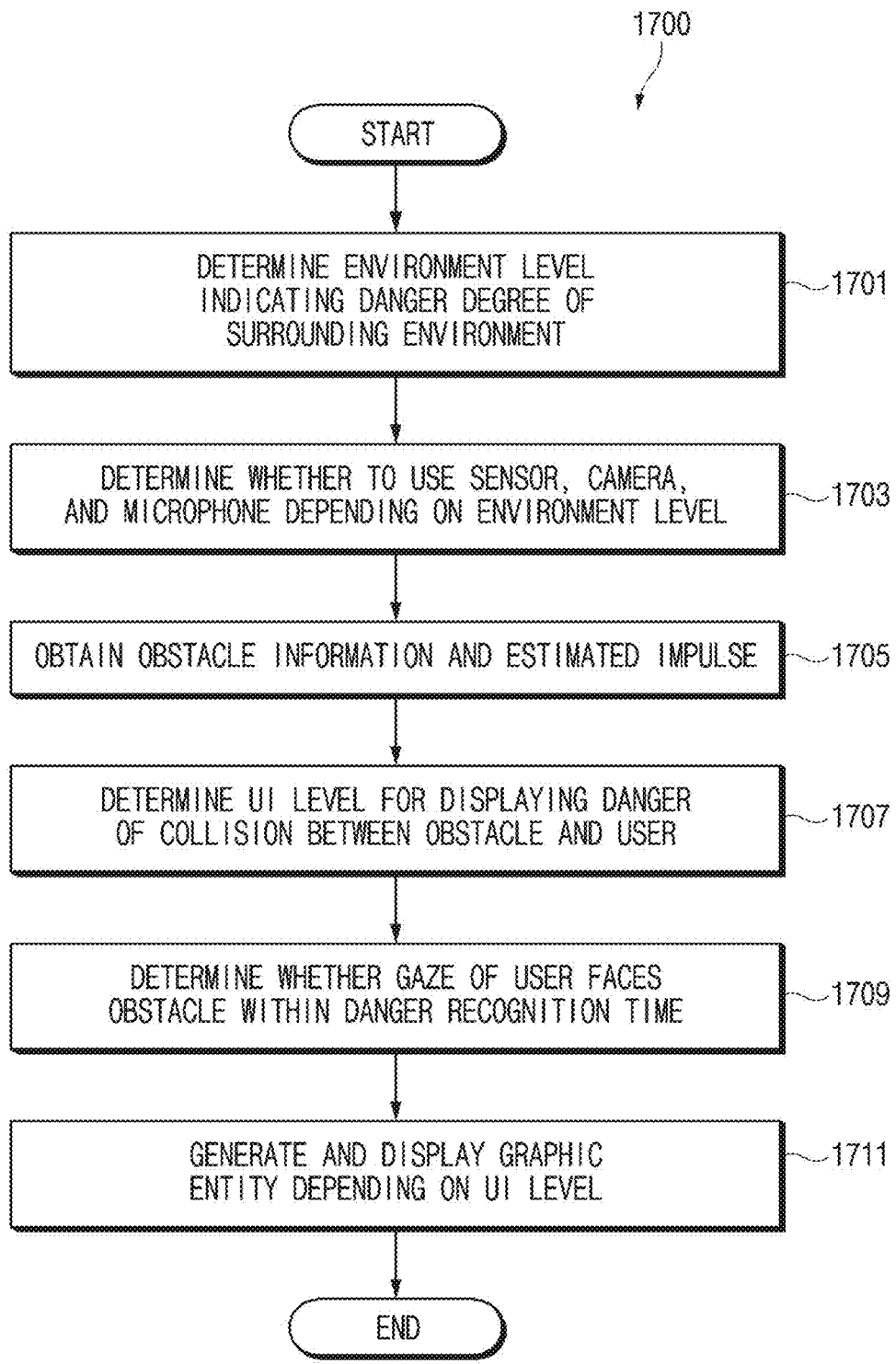
FIG. 17 is a flowchart illustrating an operation of an electronic device according to one or more embodiments of the disclosure.

FIG. 17 is a flowchart 1700 illustrating an operation of an electronic device according to one or more embodiments of the disclosure.

Referring to FIG. 17, because operations 1701, 1703, 1705, 1707, and 1711 which will be described below are able to correspond to operations 601, 603, 605, 607, and 609 of FIG. 6, respectively, the description of operations 1701, 1703, 1705, 1707, and 1711 will be replaced with the description in FIG. 6. Hereinafter, operation 1709 will be mainly described. Operations 1709 may be performed between operation 607 and operation 609 of FIG. 6.

For example, immediately performing danger indications for all obstacles may help to prevent danger of a user, but may enable the user to cause discomfort and fatigue and may increase resources and power consumption of the electronic device 401. The electronic device 401 may differently set a danger recognition time depending on a UI level and may cancel or suspend a danger indication for the corresponding obstacle, when the user recognizes the obstacle within a danger recognition time. For example, as the UI level is higher, the electronic device 401 may set the danger recognition time to be shorter.

In operation 1709, the electronic device 401 may determine whether the gaze of the user faces the obstacle within the danger recognition time. The electronic device 401 may assign the danger recognition time set according to the UI level determined in operation 1707 to the obstacle. The electronic device 401 may suspend displaying an obstacle-related UI during the danger recognition time, but not limited thereto. The electronic device 401 may determine whether the gaze of the user faces the obstacle within the danger recognition time assigned to the obstacle. When the gaze of the user faces the obstacle within the danger recognition time, the electronic device 401 may suspend displaying the obstacle-related UI. When the gaze of the user faces the obstacle within the danger recognition time, the electronic device 401 may reassign the danger recognition time. When the gaze of the user faces the obstacle within the danger recognition time, the electronic device 401 may initialize the danger recognition time. When the gaze of the user does not face the obstacle within the danger recognition time, the electronic device 401 may display the obstacle-related UI.

When the obstacle is recognized, the electronic device 401 may determine a danger recognition area for the obstacle. For example, the danger recognition area may be a virtual area including a specified ratio or more of the obstacle. The electronic device 401 may recognize and track a gaze position of the user using a camera 410. For example, the electronic device 401 may obtain a gaze position of the user based on a binocular image of the user, which is obtained through the camera 410, or may obtain a gaze position of the user based on a direction the electronic device 401 faces, which is obtained through the camera 410. The electronic device 401 may identify whether the gaze of the user is included in the danger recognition area. The electronic device 401 may identify whether the gaze position of the user, which is recognized using the camera 410, is a position in the danger recognition area. When the gaze of the user is included in the danger recognition area within the danger recognition time, the electronic device 401 may suspend displaying the obstacle-related UI. When the gaze of the user is included in the danger recognition area within the danger recognition time, the electronic device 401 may reassign the danger recognition time. When the gaze of the user is included in the danger recognition area within the danger recognition time, the electronic device 401 may initialize the danger recognition time. When the gaze of the user is not included in the danger recognition area within the danger recognition time, the electronic device 401 may display the obstacle-related UI.

The electronic device 401 may measure a time when the gaze of the user remains in the danger recognition area. For example, when the gaze of the user remains in the danger recognition area during a specified time or more, the electronic device 401 may identify that the gaze of the user is included in the danger recognition area.

For example, the electronic device 401 may perform operation 1707 to determine the UI level as "Caution". The danger recognition time set in response to the "Caution" level may be 4 seconds. The electronic device 401 may identify whether the user recognizes the obstacle within 4 seconds. The electronic device 401 may suspend displaying the obstacle-related UI during 4 seconds. When the user recognizes the obstacle within 4 seconds, the electronic device 401 may initialize the danger recognition time of 4 seconds. For example, when the user recognizes the obstacle at a time point when 3 seconds elapse, the electronic device 401 may initialize 3 seconds to 0 seconds and may identify whether the user recognizes the obstacle within 4 seconds again. The electronic device 401 may suspend displaying the obstacle-related UI until 4 seconds elapse again.

The electronic device 401 may differently set the reassigned danger recognition time to be different from the previously assigned danger recognition time. For example, the electronic device 401 may set the reassigned danger recognition time to be longer than the previously assigned danger recognition time. In the above-mentioned example, when the user recognizes the obstacle at the time point when 3 seconds elapse, the electronic device 401 may initialize 3 seconds to 0 seconds and may identify whether the user recognizes the obstacle within 8 seconds.

According to the above description, the electronic device 401 may suspend displaying the obstacle-related UI during the danger recognition time, but not limited thereto. The electronic device 401 may identify whether the user recognizes the obstacle within the danger recognition time in the state in which the obstacle-related UI is displayed. When the user recognizes the obstacle within the danger recognition time, the electronic device 401 may cancel or hide displaying the obstacle-related UI. When the user does not recognize the obstacle within the danger recognition time, the electronic device 401 may maintain the displaying of the obstacle-related UI.

When it is determined to display the obstacle-related UI in operation 1709, the electronic device 401 may perform operation 1711.

Hereinafter, a description will be given of a method for suspending displaying danger for an obstacle in an electronic device 401 with reference to FIG. 18.

Figure 18:
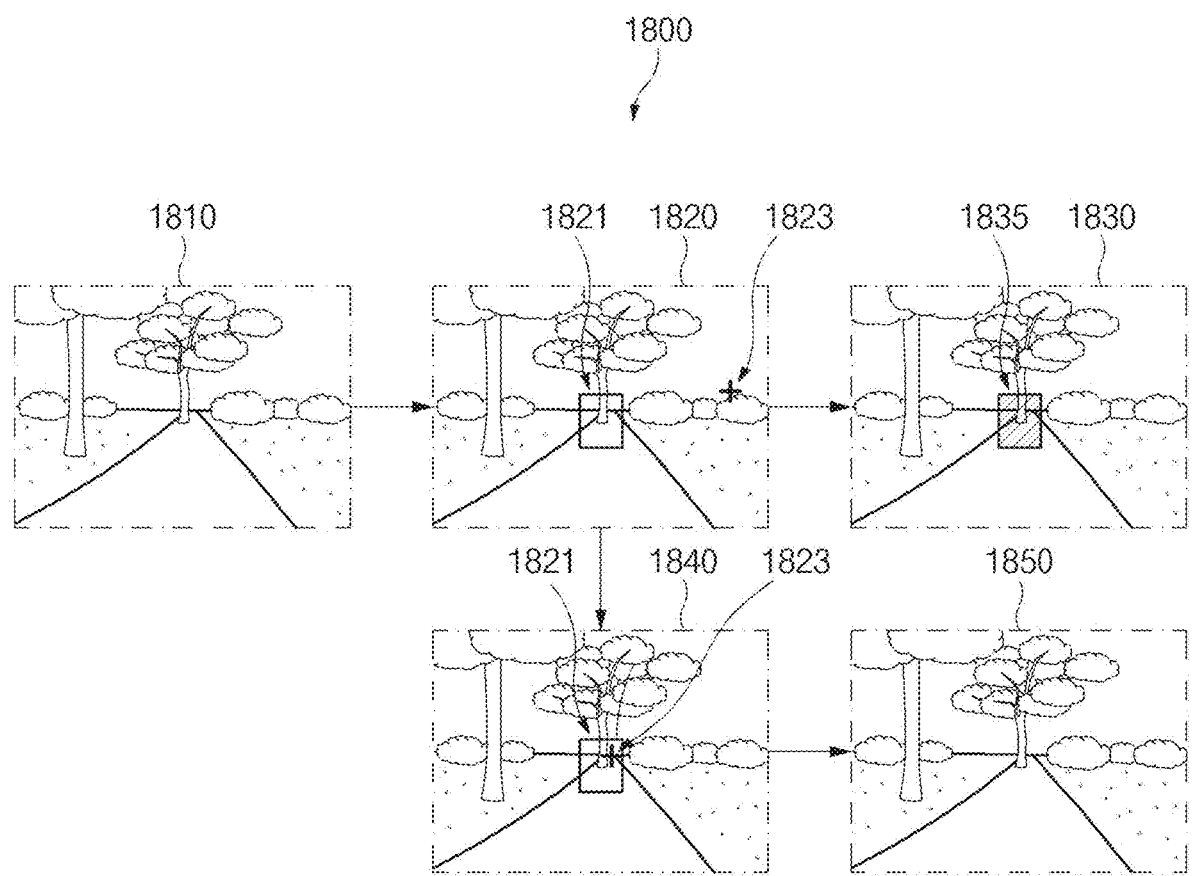
FIG. 18 is a drawing illustrating a method for suspending displaying an obstacle-related UI in an electronic device according to one or more embodiments of the disclosure.

FIG. 18 is a drawing 1800 illustrating a method for suspending displaying an obstacle-related UI in an electronic device according to one or more embodiments of the disclosure.

Referring to FIG. 18, the electronic device 401 may display a first screen 1810, a second screen 1820, a third screen 1830, a fourth screen 1840, or a fifth screen 1850 on the display 420.

Referring to the first screen 1810, the electronic device 401 may recognize a tree located in the front as an obstacle. The electronic device 401 may assign a danger recognition time to the recognized obstacle. The danger recognition time may be a time set in response to a UI level determined for the obstacle by the electronic device 401.

Referring to the second screen 1820, the electronic device 401 may determine (or generate) a danger recognition area 1821. The danger recognition area 1821 may include a specified ratio or more of the obstacle. The danger recognition area 1821 may be a virtual area which is not displayed on the second screen 1820. The electronic device 401 may recognize a gaze position 1823 of a user. The gaze position 1823 of the user may fail to be included in the danger recognition area 1821 at a time point when the second screen 1820 is output.

The electronic device 401 may identify whether the gaze position 1823 of the user is included in the danger recognition area 1821 within the danger recognition time. When a time when the gaze position 1823 of the user is included and maintained in the danger recognition area 1821 within the danger recognition time is greater than or equal to a specified time, the electronic device 401 may identify that the user recognizes the obstacle within the danger recognition time.

When the gaze position 1823 of the user is not included in the danger recognition area 1821 within the danger recognition time or the time when the gaze position 1823 of the user is included and maintained in the danger recognition area 1821 within the danger recognition time is less than the specified time, the electronic device 401 may display the third screen 1830. The third screen 1830 may display an obstacle-related UI 1835. The obstacle-related UI 1835 may indicate danger by the obstacle.

Referring to the fourth screen 1840, the electronic device 401 may include the gaze position 1823 of the user in the danger recognition area 1821 within the danger recognition time. When the time when the gaze position 1823 of the user is included and maintained in the danger recognition area 1821 within the danger recognition time is greater than or equal to the specified time, the electronic device 401 may display the fifth screen 1850. The fifth screen 1850 may fail to include the obstacle-related UI 1835. When the time when the gaze position 1823 of the user is included and maintained in the danger recognition area 1821 within the danger recognition time is greater than or equal to the specified time, the electronic device 401 may suspend displaying the obstacle-related UI 1835.

When the time when the gaze position 1823 of the user is included and maintained in the danger recognition area 1821 within the danger recognition time is greater than or equal to the specified time, the electronic device 401 may reassign the danger recognition time. The reassigned risk recognition time may be set to be the same as or different from the previously assigned risk recognition time. The electronic device 401 may identify whether the gaze position 1823 of the user is included in the danger recognition area 1821 within the reassigned danger recognition time and may determine to suspend displaying the obstacle-related UI 1835 or to display the obstacle-related UI 1835.

For example, immediately displaying the obstacle-related UI for all the recognized obstacles in the electronic device 401 may allow the user to cause discomfort and fatigue and may increase power and resource consumption. When it is determined that the user recognizes the obstacle, the electronic device 401 may suspend displaying the obstacle-related UI to reduce the provision of unnecessary information.

As a wearable device which provides a VR or AR environment is commercialized, there is a need to prevent a safety accident capable of occurring when wearing the wearable device. For example, it is relatively more exposed to danger when the wearable device is used in the outside than when the wearable device is used in the inside. For example, there may be a relatively high possibility of colliding with a surrounding vehicle or a pedestrian, while concentrating on a display of the wearable device when the wearable device is used at a driveway, a crosswalk, or a crossing. Furthermore, there may be a high possibility that the user will receive a stronger impact when colliding with the obstacle in an outdoor environment than a collision accident with the obstacle in the inside.

One or more embodiments of the disclosure may provide an obstacle-related UI on which the user intuitively recognizes danger by the obstacle. One or more embodiments of the disclosure may provide an obstacle-related UI on which the user intuitively recognizes a danger level by the obstacle, which may vary with a surrounding environment and the obstacle.

Furthermore, one or more embodiments of the disclosure may prevent information associated with the obstacle from being unnecessarily delivered to the user. However, one or more embodiments of the disclosure is not limited to the above-mentioned contents.

A wearable electronic device (101, 201, 401) according to one or more embodiments t of the disclosure may include the camera module (180, 280-1, 280-2, 280-3, 276-1, 276-2, 410), the display module (160, 261-1, 261-2, 420), a microphone (150, 271-1, 271-2, 271-3, 430), the sensor module (176, 440), the memory (130, 450), and the processor (120, 460). The processor may be operatively connected with the camera, the display, the microphone, the sensor, and the memory. The memory may store one or more instructions, when executed by the processor, causing the wearable electronic device to determine an environment level indicating a danger degree of a surrounding environment for a user of the wearable electronic device based on an image obtained through the camera. The instructions may, when executed by the processor, cause the wearable electronic device to determine whether to use the sensor, the camera, and the microphone depending on the determined environment level. The instructions may, when executed by the processor, cause the wearable electronic device to obtain obstacle information and an estimated impulse between an obstacle and the user based on data input through at least one determined to be used among the sensor, the camera, or the microphone. The instructions may, when executed by the processor, cause the wearable electronic device to determine a user interface (UI) level for displaying danger of collision between the obstacle and the user based on the environment level, the obstacle information, and the estimated impulse. The instructions may, when executed by the processor, cause the wearable electronic device to generate a graphic entity indicating a direction and a danger degree of the obstacle depending on the UI level. The instructions may, when executed by the processor, cause the wearable electronic device to display an obstacle-related UI including the graphic entity on the display. According to one or more embodiments of the disclosure, there may be various effects including an effect capable of displaying information associated with the obstacle on the display such that the user is able to intuitively recognize danger by the obstacle.

According to one or more embodiments of the disclosure, the instructions may, when executed by the processor, cause the wearable electronic device to determine a minimum level and a maximum level of the UI level based on the environment level. The instructions may, when executed by the processor, cause the wearable electronic device to determine the UI level within a range by the minimum level and the maximum level based on the obstacle information and the estimated impulse. According to one or more embodiments of the disclosure, there may be various effects including an effect capable of displaying information associated with the obstacle on the display to intuitively recognize a danger level by the obstacle, which may vary with the surrounding environment and the obstacle.

According to one or more embodiments of the disclosure, at least one of whether it is possible to set whether to display an obstacle-related UI based on a user input or a relationship between the obstacle-related UI and another UI may vary with the UI level.

According to one or more embodiments of the disclosure, it may be possible to set whether to display the obstacle-related UI based on the user input, when the UI level is determined as a first UI level. It may be impossible to set whether to display the obstacle-related UI based on the user input, when the UI level is determined as a second UI level higher than the first UI level. Alternatively, acknowledgement may be requested from the user in response to the user input not to display the obstacle-related UI or a notification of recommending displaying the obstacle-related UI may be output on the display, when it is determined as the second UI level higher than the first UI level. According to one or more embodiments of the disclosure, there may be various effects including an effect capable of reducing discomfort and fatigue of the user, which are caused by uniformly displaying danger even for an obstacle with a low danger degree, and reducing power and resource consumption of the wearable electronic device.

According to one or more embodiments of the disclosure, the instructions may, when executed by the processor, cause the wearable electronic device to display only the other UI and not to display the obstacle-related UI, when the first UI level is determined as the first UI level. The instructions may, when executed by the processor, cause the wearable electronic device to display the obstacle-related UI behind the other UI, when the UI level is determined as the second UI level higher than the first UI level. The instructions may, when executed by the processor, cause the wearable electronic device to display the obstacle-related UI in front of the other UI, when the UI level is determined as a third UI level higher than the second UI level. The instructions may, when executed by the processor, cause the wearable electronic device to display only the obstacle-related UI and not to display the other UI, when the UI level is determined as a fourth UI level higher than the third UI level. According to one or more embodiments of the disclosure, there may be various effects including an effect capable of displaying the obstacle-related UI such as the user is easy to recognize danger as the danger level of the user becomes high.

According to one or more embodiments of the disclosure, the instructions may, when executed by the processor, cause the wearable electronic device to receive a user input for adjusting the minimum level or the maximum level. The instructions may, when executed by the processor, cause the wearable electronic device to adjust the minimum level or the maximum level in response to the user input. The instructions may, when executed by the processor, cause the wearable electronic device to guide a UI level recommended according to the environment level, when the adjusted minimum level or the adjusted maximum level is lower than a specified level.

According to one or more embodiments of the disclosure, the instructions may, when executed by the processor, cause the wearable electronic device to identify whether the obstacle is an obstacle within a viewing angle range or an obstacle out of the viewing angle range. The instructions may, when executed by the processor, cause the wearable electronic device to differently determine a UI level for starting to display the obstacle-related UI depending on the identified result. The instructions may, when executed by the processor, cause the wearable electronic device to differently determine a UI display method for the same UI level depending on the identified result.

According to one or more embodiments of the disclosure, the instructions may, when executed by the processor, cause the wearable electronic device to determine a danger recognition area for the obstacle. The instructions may, when executed by the processor, cause the wearable electronic device to assign a danger recognition time set according to the UI level to the obstacle. The instructions may, when executed by the processor, cause the wearable electronic device to identify whether a gaze of the user is included in the danger recognition area within the danger recognition time. The instructions may, when executed by the processor, cause the wearable electronic device to suspend displaying the obstacle-related UI and reassign the danger recognition time, when the gaze of the user is included in the danger recognition area within the danger recognition time. According to one or more embodiments of the disclosure, there may be various effects including an effect capable of preventing information associated with an unnecessary obstacle from being displayed. According to one or more embodiments of the disclosure, there may be various effects including an effect capable of reducing discomfort and fatigue of the user, which are caused by immediately performing displaying danger even for all obstacles, and reducing power and resource consumption of the wearable electronic device.

According to one or more embodiments of the disclosure, the instructions may, when executed by the processor, cause the wearable electronic device to differently determine at least one of a size, transparency, or a color of the graphic entity based on the estimated impulse. The instructions may, when executed by the processor, cause the wearable electronic device to differently determine at least one of a direction indicated by the graphic entity, a direction range, or the number of the graphic entities based on the obstacle information. According to one or more embodiments of the disclosure, there may be various effects including an effect capable of intuitively recognizing a danger level for each obstacle.

According to one or more embodiments of the disclosure, the instructions may, when executed by the processor, cause the wearable electronic device to classify the image based on at least one of whether it is the inside or the outside, analysis of a vehicle-related element, or obstacle complexity. The instructions may, when executed by the processor, cause the wearable electronic device to determine the environment level depending on the classified result.

According to one or more embodiments of the disclosure, an operating method of a wearable electronic device (101, 201, 401) may include determining (in operation 601) an environment level indicating a danger degree of a surrounding environment for a user of the wearable electronic device based on an image obtained through the camera module (180, 280-1, 280-2, 280-3, 276-1, 276-2, 410). The method may include determining (in operation 603) whether to use the sensor module (176, 440), the camera, and a microphone (150, 271-1, 271-2, 271-3, 430) depending on the determined environment level. The method may include obtaining (in operation 605) obstacle information and an estimated impulse between an obstacle and the user based on data input through at least one determined to be used among the sensor, the camera, or the microphone. The method may include determining (in operation 607) a user interface (UI) level for displaying danger of collision between the obstacle and the user based on the environment level, the obstacle information, and the estimated impulse. The method may include generating (in operation 609) a graphic entity indicating a direction and a danger degree of the obstacle depending on the UI level. The method may include displaying (in operation 609) an obstacle-related UI including the graphic entity on the display module (160, 261-1, 261-2, 420).

According to one or more embodiments of the disclosure, the determining of the UI level may include determining a minimum level and a maximum level of the UI level based on the environment level. The determining of the UI level may include determining the UI level within a range by the minimum level and the maximum level based on the obstacle information and the estimated impulse.

According to one or more embodiments of the disclosure, the method may include determining at least one of whether it is possible to set whether to display an obstacle-related UI based on a user input or a relationship between the obstacle-related UI and another UI, depending on the UI level.

According to one or more embodiments of the disclosure, whether to display the obstacle-related UI based on the user input may be set, when the UI level is determined as a first UI level. Whether to display the obstacle-related UI may be set based on the UI level, when the UI level is determined as a second UI level higher than the first UI level. Alternatively, acknowledgement may be requested from the user in response to the user input not to display the obstacle-related UI or a notification of recommending displaying the obstacle-related UI may be output on the display, when the UI level is determined as the second UI level higher than the first UI level.

According to one or more embodiments of the disclosure, the displaying of the obstacle-related UI may include displaying only the other UI and failing to display the obstacle-related UI, when the UI level is determined as the first UI level. The displaying of the obstacle-related UI may include displaying the obstacle-related UI behind the other UI, when the UI level is determined as the second UI level higher than the first UI level. The displaying of the obstacle-related UI may include displaying the obstacle-related UI in front of the other UI, when the UI level is determined as a third UI level higher than the second UI level. The displaying of the obstacle-related UI may include displaying only the obstacle-related UI and failing to display the other UI, when the UI level is determined as a fourth UI level higher than the third UI level.

According to one or more embodiments of the disclosure, the determining of the UI level may include receiving a user input for adjusting the minimum level or the maximum level. The determining of the UI level may include adjusting the minimum level or the maximum level in response to the user input. The determining of the UI level may include guiding a UI level recommended according to the environment level, when the adjusted minimum level or the adjusted maximum level is lower than a specified level.

According to one or more embodiments of the disclosure, the method may include identifying whether the obstacle is an obstacle within a viewing angle range or an obstacle out of the viewing angle range. The method may include differently determining a UI level for starting to display the obstacle-related UI depending on the identified result. The method may include differently determining a UI display method for the same UI level depending on the identified result.

According to one or more embodiments of the disclosure, the method may include determining a danger recognition area for the obstacle. The method may include assigning of a danger recognition time set according to the UI level to the obstacle. The method may include identifying whether a gaze of the user is included in the danger recognition area within the danger recognition time. The method may be to suspend displaying the obstacle-related UI, when the gaze of the user is included in the danger recognition area within the danger recognition time. The method may include reassigning the danger recognition time, when gaze of the user is included in the danger recognition area within the danger recognition time.

According to one or more embodiments of the disclosure, the method may include differently determining at least one of a size, transparency, or a color of the graphic entity based on the estimated impulse. The method may include differently determining at least one of a direction indicated by the graphic entity, a direction range, or the number of the graphic entities based on the obstacle information.

According to one or more embodiments of the disclosure, the determining of the environment level may include classifying the image based on at least one of whether it is the inside or the outside, analysis of a vehicle-related element, or obstacle complexity. The determining of the environment level may include determining the environment level depending on the classified result.

According to one or more embodiments of the disclosure, a non-transitory computer-readable storage medium may store a program for performing an operating method of a wearable electronic device (101, 201, 401). The operating method of the wearable electronic device may include determining (601) an environment level indicating a danger degree of a surrounding environment for a user of the wearable electronic device based on an image obtained through the camera module (180, 280-1, 280-2, 280-3, 276-1, 276-2, 410). The method may include determining (603) whether to use the sensor module (176, 440), the camera, and a microphone (150, 271-1, 271-2, 271-3, 430) depending on the determined environment level. The method may include obtaining (605) obstacle information and an estimated impulse between an obstacle and the user based on data input through at least one determined to be used among the sensor, the camera, or the microphone. The method may include determining (607) a user interface (UI) level for displaying danger of collision between the obstacle and the user based on the environment level, the obstacle information, and the estimated impulse. The method may include generating (609) a graphic entity indicating a direction and a danger degree of the obstacle depending on the UI level. The method may include displaying (609) an obstacle-related UI including the graphic entity on a display module (160, 261-1, 261-2, 420).

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
a camera;
a display;
a microphone;
a sensor;
memory storing one or more computer programs; and
one or more processors communicatively coupled with the camera, the display, the microphone, the sensor, and the memory,
wherein the one or more computer programs include computer-executable instructions that, when executed by the one or more processors individually or collectively, cause the wearable electronic device to:
determine an environment level indicating a danger degree of a surrounding environment for a user of the wearable electronic device based on an image obtained through the camera,
determine whether to use the sensor, the camera, and the microphone depending on the determined environment level,
obtain obstacle information and an estimated impulse between an obstacle and the user based on data input through at least one determined to be used among the sensor, the camera, or the microphone,
determine a user interface (UI) level for displaying danger of collision between the obstacle and the user based on the environment level, the obstacle information, and the estimated impulse,
generate a graphic entity indicating a direction and a danger degree of the obstacle depending on the UI level, and
display an obstacle-related UI including the graphic entity on the display.

2. The wearable electronic device of claim 1, wherein the one or more computer programs further include computer-executable instructions that, when executed by the one or more processors, cause the wearable electronic device to:
determine a minimum level and a maximum level of the UI level based on the environment level, and
determine the UI level within a range by the minimum level and the maximum level based on the obstacle information and the estimated impulse.

3. The wearable electronic device of claim 1, wherein at least one of whether it is possible to set whether to display the obstacle-related UI based on a user input or a relationship between the obstacle-related UI and another UI varies with the UI level.

4. The wearable electronic device of claim 1,
wherein, it is possible to set whether to display the obstacle-related UI based on the user input, when the UI level is determined as a first UI level, and
wherein, it is impossible to set whether to display the obstacle-related UI based on the user input, acknowledgement is requested from the user in response to a user input not to display the obstacle-related UI, or a notification of recommending displaying the obstacle-related UI is output on the display, when the UI level is determined as a second UI level higher than the first UI level.

5. The wearable electronic device of claim 4, wherein the one or more computer programs further include computer-executable instructions that, when executed by the one or more processors, cause the wearable electronic device to:
display only other UI and fail to display the obstacle-related UI, when the UI level is determined as the first UI level,
display the obstacle-related UI behind the other UI, when the UI level is determined as the second UI level higher than the first UI level,
display the obstacle-related UI in front of the other UI, when the UI level is determined as a third UI level higher than the second UI level, and
display only the obstacle-related UI and fail to display the other UI, when the UI level is determined as a fourth UI level higher than the third UI level.

6. The wearable electronic device of claim 1, wherein the one or more computer programs further include computer-executable instructions that, when executed by the one or more processors, cause the wearable electronic device to:
receive a user input for adjusting a minimum level or the maximum level,
adjust the minimum level or a maximum level in response to the user input, and
guide a UI level recommended according to the environment level, when adjusted minimum level or the adjusted maximum level is lower than a specified level.

7. The wearable electronic device of claim 1, wherein the one or more computer programs further include computer-executable instructions that, when executed by the one or more processors, cause the wearable electronic device to:
identify whether the obstacle is an obstacle within a viewing angle range or an obstacle out of the viewing angle range,
differently determine a UI level for starting to display the obstacle-related UI depending on the identified result, and
differently determine a UI display method for a same UI level depending on the identified result.

8. The wearable electronic device of claim 1, wherein the one or more computer programs further include computer-executable instructions that, when executed by the one or more processors, cause the wearable electronic device to:
determine a danger recognition area for the obstacle,
assign a danger recognition time set according to the UI level to the obstacle,
identify whether a gaze of the user is included in the danger recognition area within the danger recognition time, and
suspend displaying the obstacle-related UI and reassign the danger recognition time, when the gaze of the user is included in the danger recognition area within the danger recognition time.

9. The wearable electronic device of claim 1, wherein the one or more computer programs further include computer-executable instructions that, when executed by the one or more processors, cause the wearable electronic device to:
differently determine at least one of a size, transparency, or a color of the graphic entity based on the estimated impulse, and
differently determine at least one of a direction indicated by the graphic entity, a direction range, or a number of graphic entities based on the obstacle information.

10. The wearable electronic device of claim 1, wherein the one or more computer programs further include computer-executable instructions that, when executed by the one or more processors, cause the wearable electronic device to:

classify the image based on at least one of whether it is inside or outside, analysis of a vehicle-related element, or obstacle complexity, and determine the environment level depending on the classified result.

11. A method of operating a wearable electronic device, the method comprising:

determining an environment level indicating a danger degree of a surrounding environment for a user of the wearable electronic device based on an image obtained through a camera;

determining whether to use a sensor, the camera, and a microphone depending on the determined environment level;

obtaining obstacle information and an estimated impulse between an obstacle and the user based on data input through at least one determined to be used among the sensor, the camera, or the microphone;

determining a user interface (UI) level for displaying danger of collision between the obstacle and the user based on the environment level, the obstacle information, and the estimated impulse;

generating a graphic entity indicating a direction and a danger degree of the obstacle depending on the UI level; and displaying an obstacle-related UI including the graphic entity on a display.

12. The method of claim 11, wherein the determining of the UI level includes:

determining a minimum level and a maximum level of the UI level based on the environment level; and determining the UI level within a range by the minimum level and the maximum level based on the obstacle information and the estimated impulse.

13. The method of claim 12, further comprising:

determining at least one of whether it is possible to set whether to display the obstacle-related UI based on a user input or a relationship between the obstacle-related UI and another UI, depending on the UI level.

14. The method of claim 13, further comprising:

setting whether to display the obstacle-related UI based on the user input, when the UI level is determined as a first UI level; and setting whether to display the obstacle-related UI based on the UI level, requesting acknowledgement from the user in response to a user input not to display the obstacle-related UI, or outputting a notification of recommending displaying the obstacle-related UI on the display, when the UI level is determined as a second UI level higher than the first UI level.

15. The method of claim 14, wherein the displaying of the obstacle-related UI includes:

displaying only other UI and failing to display the obstacle-related UI, when the UI level is determined as the first UI level;

displaying the obstacle-related UI behind the other UI, when the UI level is determined as the second UI level higher than the first UI level;

displaying the obstacle-related UI in front of the other UI, when the UI level is determined as a third UI level higher than the second UI level; and displaying only the obstacle-related UI and failing to display the other UI, when the UI level is determined as a fourth UI level higher than the third UI level.

16. The method of claim 11, wherein the determining of the UI level includes:

receiving a user input for adjusting a minimum level or the maximum level;

adjusting the minimum level or a maximum level in response to the user input; and guiding a UI level recommended according to the environment level, when adjusted minimum level or the adjusted maximum level is lower than a specified level.

17. The method of claim 11, further comprising:

identifying whether the obstacle is an obstacle within a viewing angle range or an obstacle out of the viewing angle range;

differently determining a UI level for starting to display the obstacle-related UI depending on the identified result; and differently determining a UI display method for a same UI level depending on the identified result.

18. The method of claim 11, further comprising:

determining a danger recognition area for the obstacle;

assigning a danger recognition time set according to the UI level to the obstacle;

identifying whether a gaze of the user is included in the danger recognition area within the danger recognition time; and suspending displaying the obstacle-related UI and reassigning the danger recognition time, when the gaze of the user is included in the danger recognition area within the danger recognition time.

19. One or more non-transitory computer-readable storage media storing computer-executable instructions that, when executed by one or more processors individually or collectively, cause a wearable electronic device to perform operations, the operations comprising:

determining an environment level indicating a danger degree of a surrounding environment for a user of the wearable electronic device based on an image obtained through a camera;

determining whether to use a sensor, the camera, and a microphone depending on the determined environment level;

obtaining obstacle information and an estimated impulse between an obstacle and the user based on data input through at least one determined to be used among the sensor, the camera, or the microphone;

determining a user interface (UI) level for displaying danger of collision between the obstacle and the user based on the environment level, the obstacle information, and the estimated impulse;

generating a graphic entity indicating a direction and a danger degree of the obstacle depending on the UI level; and displaying an obstacle-related UI including the graphic entity on a display.

20. The one or more non-transitory computer-readable storage media of claim 19, the operations further comprising:

determining a minimum level and a maximum level of the UI level based on the environment level; and determining the UI level within a range by the minimum level and the maximum level based on the obstacle information and the estimated impulse.

* * * * *